United States Patent
Ogura et al.

(10) Patent No.: US 11,186,170 B2
(45) Date of Patent: Nov. 30, 2021

(54) WORK VEHICLE

(71) Applicant: Yanmar Co., Ltd., Osaka (JP)

(72) Inventors: Kouhei Ogura, Osaka (JP); Toshiyuki Miwa, Osaka (JP); Kenta Ikenori, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 202 days.

(21) Appl. No.: 15/772,911

(22) PCT Filed: Nov. 1, 2016

(86) PCT No.: PCT/JP2016/082425
§ 371 (c)(1),
(2) Date: May 2, 2018

(87) PCT Pub. No.: WO2017/078012
PCT Pub. Date: May 11, 2017

(65) Prior Publication Data
US 2018/0326845 A1 Nov. 15, 2018

(30) Foreign Application Priority Data
Nov. 5, 2015 (JP) .............................. JP2015-217910

(51) Int. Cl.
*B60K 20/02* (2006.01)
*G05G 1/06* (2006.01)
(Continued)

(52) U.S. Cl.
CPC .............. *B60K 20/02* (2013.01); *B60K 20/00* (2013.01); *G05G 1/06* (2013.01); *G05G 7/04* (2013.01);
(Continued)

(58) Field of Classification Search
CPC ......... E02F 9/20; E02F 9/2062; E02F 9/2004; E02F 9/2066; E02F 9/2079; E02F 9/2253;
(Continued)

(56) References Cited

U.S. PATENT DOCUMENTS

| 4,279,324 A | 7/1981 | Yotsumoto et al. |
| 8,336,522 B2 * | 12/2012 | Kim .......................... E02F 9/26 123/350 |

(Continued)

FOREIGN PATENT DOCUMENTS

| JP | 63-269733 A | 11/1988 |
| JP | 2000-071801 A | 3/2000 |

(Continued)

OTHER PUBLICATIONS

International Search Report dated Dec. 7, 2017 issued in corresponding PCT Application PCT/JP2016/082425 cites the patent documents above.

(Continued)

*Primary Examiner* — Luis A Gonzalez

(74) *Attorney, Agent, or Firm* — Norton Rose Fulbright US LLP

(57) ABSTRACT

A work vehicle according to an aspect of the present invention is configured to shift, in a transmission unit, a speed of a driving force from an engine mounted on a traveling body and to transfer the shifted driving force to a traveling unit and a work unit. The work vehicle includes: a mode shift switch that is configured to shift a maximum vehicle speed by the traveling unit or a maximum number of (Continued)

revolutions of the engine, the maximum vehicle speed and the maximum number of revolutions being set for each of a plurality of modes; and a work unit operation lever that is configured to be used for operating the work unit. The work unit operation lever is provided with the mode shift switch.

20 Claims, 20 Drawing Sheets

(51) Int. Cl.
*B60K 20/00* (2006.01)
*G05G 7/04* (2006.01)
*F16H 59/12* (2006.01)
*F16H 59/50* (2006.01)
*E02F 9/20* (2006.01)

(52) U.S. Cl.
CPC .............. *E02F 9/2062* (2013.01); *F16H 59/12* (2013.01); *F16H 59/50* (2013.01)

(58) Field of Classification Search
CPC ........ E02F 9/2012; F16H 59/12; B60K 20/02; G05G 1/06; G05G 2009/04774
See application file for complete search history.

(56) References Cited

U.S. PATENT DOCUMENTS

| | | | |
|---|---|---|---|
| 8,979,208 B2* | 3/2015 | Roach | B60P 1/04 |
| | | | 298/22 C |
| 2005/0279561 A1* | 12/2005 | Shearer | E02F 3/7663 |
| | | | 180/333 |
| 2011/0303045 A1 | 12/2011 | Masumoto | |
| 2014/0003900 A1* | 1/2014 | Hyodo | G05G 9/047 |
| | | | 414/685 |

FOREIGN PATENT DOCUMENTS

| | | | |
|---|---|---|---|
| JP | 2012188861 A | * | 10/2012 |
| JP | 2013-112104 A | | 6/2013 |
| JP | 2013-170609 A | | 9/2013 |
| JP | 2015-118626 A | | 6/2015 |

OTHER PUBLICATIONS

Supplementary European Search Report dated Oct. 23, 2018 to the corresponding European Serial No. 16/862,072, citing the art listed above.

* cited by examiner

WORK VEHICLE

CROSS REFERENCES TO RELATED APPLICATIONS

This application is a national stage application pursuant to 35 U.S.C. § 371 of International Application No. PCT/JP2016/082425, filed on Nov. 1, 2016, which claims priority under 35 U.S.C. § 119 to Japanese Patent Application No. 2015-217910, filed on Nov. 5, 2015, the disclosures of which are hereby incorporated by reference in their entireties.

TECHNICAL FIELD

The present invention relates to a work vehicle exemplified by an agricultural tractor for towing a ground work machine, such as a tilling work machine or a seeding work machine, or a wheel loader for construction work.

BACKGROUND ART

In a work vehicle such as a tractor or a wheel loader, a steering wheel for steering a traveling body, a plurality of lever members for setting and adjusting a traveling state of the traveling body, and so forth are arranged around a cockpit seat in consideration of operability. An agricultural tractor, for example, includes a plurality of lever members such as a main gear shift lever, a sub-gear shift lever, a forward/reverse switching lever, and a PTO gear shift lever (see Patent Literature 1: PTL 1). The main gear shift lever is used for changing the vehicle speed of the traveling body. The sub-gear shift lever is used for holding settings of a gear shift output of a transmission within a predetermined range. The forward/reverse switching lever is used for switching the traveling direction of the traveling body between forward and reverse. The PTO gear shift lever is used for shifting the speed of an output (PTO driving force) to the work machine. In the case of attaching a loader to a front end of the tractor, a lever (joystick lever) for operating the loader is provided.

CITATION LIST

Patent Literatures

PTL 1: Japanese Patent Application Laid-Open No. 2013-112104
PTL 2: Japanese Patent Application Laid-Open No. 2013-170609

SUMMARY OF INVENTION

Technical Problem

A tractor equipped with a work unit such as a loader has a purpose of increasing working efficiency by operating the traveling unit while operating the work unit. In a conventional tractor, however, an operation tool for the work unit is retrofitted to the tractor together with a work unit, and thus, an operation intended by an operator cannot be achieved, and an increase in working efficiency is inhibited.

The present invention has a technical object of providing a tractor improved in view of circumstances described above.

Solution to Problem

A work vehicle according to an aspect of the present invention is a work vehicle configured to shift a speed of a driving force from an engine mounted on a traveling body in a transmission unit and to transfer the shifted driving force to a traveling unit and a work unit, and includes: a mode shift switch that switches a maximum vehicle speed by the traveling unit or a maximum number of revolutions of the engine, the maximum vehicle speed and the maximum number of revolutions being set for each of a plurality of modes; and a work unit operation lever configured to be used for operating the work unit, and the work unit operation lever is provided with a mode shift switch.

In this work vehicle, in a cockpit unit on the traveling body, the work unit operation lever may be disposed ahead of and outside a cockpit seat, the work unit operation lever may include a grip disposed near the cockpit seat, and the grip may be provided with the mode shift switch.

The mode shift switch may be disposed on a side surface of the grip facing the cockpit seat.

In the work vehicle, the work unit operation lever may be provided with an engine blipping switch used for performing an engine blipping operation of increasing the number of revolutions of the engine while maintaining a vehicle speed of the traveling unit constant.

In addition, an operation to the mode shift switch may be invalid while the engine blipping control is being performed.

The work vehicle may include: a gear shift pedal configured to adjust a vehicle speed by the traveling unit and the number of revolutions of the engine; and a forward/reverse switching lever configured to specify forward traveling and reverse traveling by the traveling unit, the transmission unit may include a hydraulic stepless transmission that shifts a speed of a driving force from the engine and a forward/reverse switching mechanism that switches the shifted driving force from the hydraulic stepless transmission from forward to reverse or from reverse to forward, and a transmission ratio by the hydraulic stepless transmission may be changed with the gear shift pedal, and switching by the forward/reverse switching mechanism is performed with the forward/reverse switching lever.

Advantageous Effects of Invention

According to an aspect of the present invention, with the configuration in which the work unit operation lever is provided with the mode shift switch, the maximum vehicle speed by the traveling unit and the maximum number of revolutions of the engine can be switched with the work unit operation lever according to an operating state of the work unit. Thus, the work unit and the traveling unit can be operated at the same time with a single operation tool. Accordingly, operability can be enhanced. In addition, the maximum vehicle speed by the traveling unit or the maximum number of revolutions of the engine is switched in accordance with a load on the work unit so that not only errors in work can be reduced but also the traveling time in a non-work state can be reduced, and fuel efficiency in the non-work state can be enhanced.

According to an aspect of the present invention, the grip of the work unit operation lever is provided with the mode shift switch so that the mode shift switch can be operated at a position at which an operator can easily hold the grip, and thus, operability can be further enhanced. In addition, since the mode shift switch is disposed on the side surface of the grip facing the cockpit seat, the operator can easily operate the mode shift switch with the thumb of a hand holding the grip, and thus, complexity in operation can be reduced.

According to an aspect of the present invention, the work unit operation lever is provided with the engine blipping switch for performing engine blipping control. Thus, the operator can change the number of revolutions of the engine in accordance with a load on the work unit and can keep the vehicle speed by the traveling unit constant. Accordingly, a change in the vehicle speed by the traveling unit can be reduced in accordance with a load on the work unit, and thus, a decrease in working efficiency in using the work unit can be reduced. In addition, an operation of the mode shift switch is invalid while the engine blipping control is being performed. This makes it possible to prevent the maximum vehicle speed or the maximum number of revolutions of the engine after switching from becoming an abnormal value because of an increase in the number of revolutions of the engine in the engine blipping control. As a result, occurrence of a sudden accident or the like can be avoided.

DESCRIPTION OF EMBODIMENTS

Figure 1:
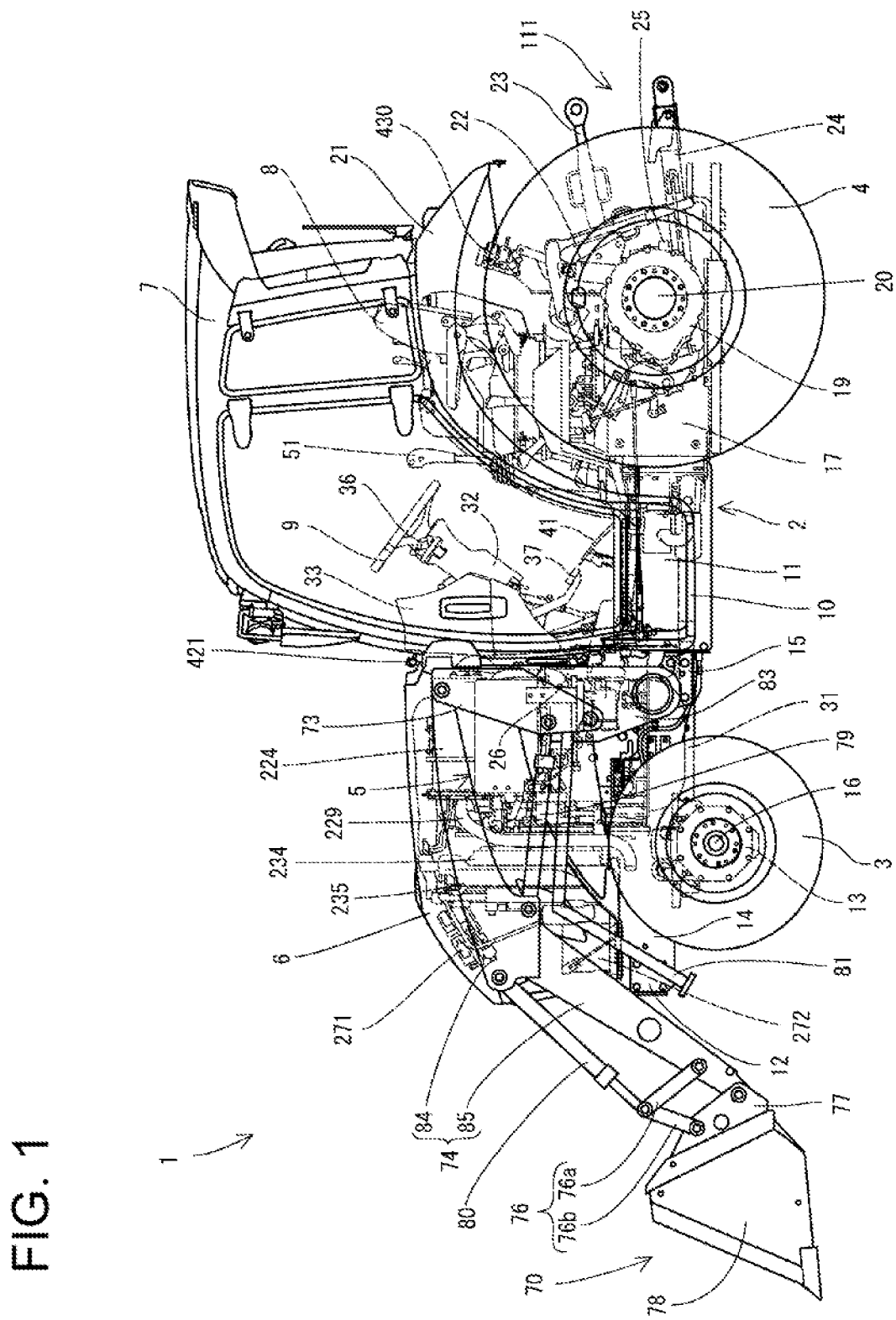
FIG. 1 A left side view of a tractor
FIG. 2 A right side view of the tractor
FIG. 3 A plan view of the tractor
FIG. 4 An illustration of the left side of a traveling body
FIG. 5 An illustration of the right side of the traveling body
FIG. 6 A driving force transfer system diagram of the tractor
FIG. 7 An enlarged plan view illustrating a configuration of the inside of a cabin
FIG. 8 A perspective view of the inside of the cabin when seen from left-forward
FIG. 9 A perspective view of the inside of the cabin when seen from right-forward
FIG. 10 A view seen forward from a cockpit seat
FIG. 11 A front view of a meter panel seen from the cockpit seat
FIG. 12 A side view of the inside of the cabin seen from the right side
FIG. 13 A perspective view illustrating a configuration around a loader lever
FIG. 14 A perspective view illustrating a configuration around a loader valve
FIG. 15 A perspective view of an appearance of the loader lever
FIG. 16 A flat cross-sectional view of the loader lever
FIG. 17 A left side view of the loader lever
FIG. 18 A rear view of the loader lever
FIG. 19 A state transition diagram for describing engine blipping control
FIG. 20 A state transition diagram for describing accelerator cooperation control
Figure 2:
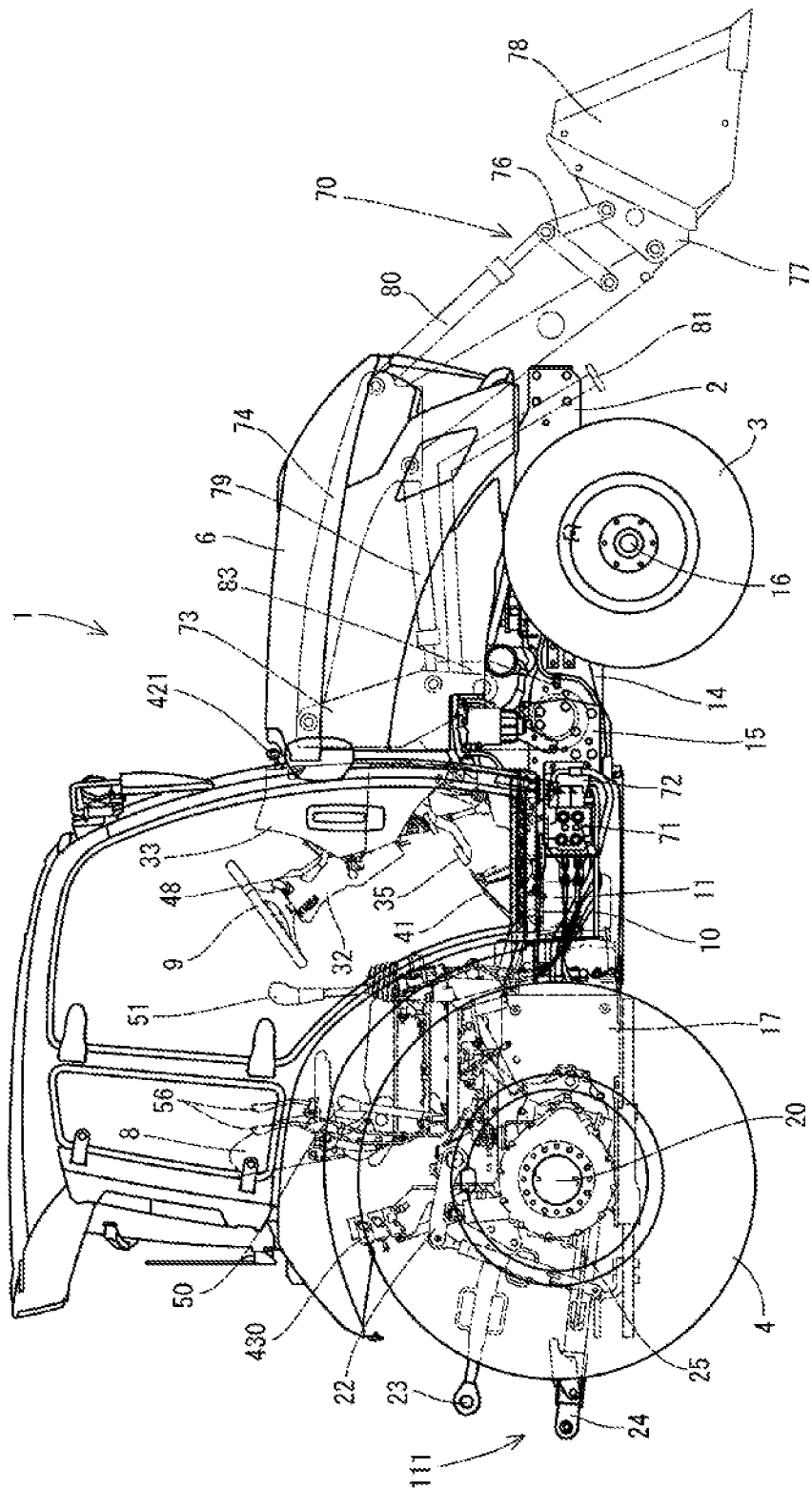
Figure 3:
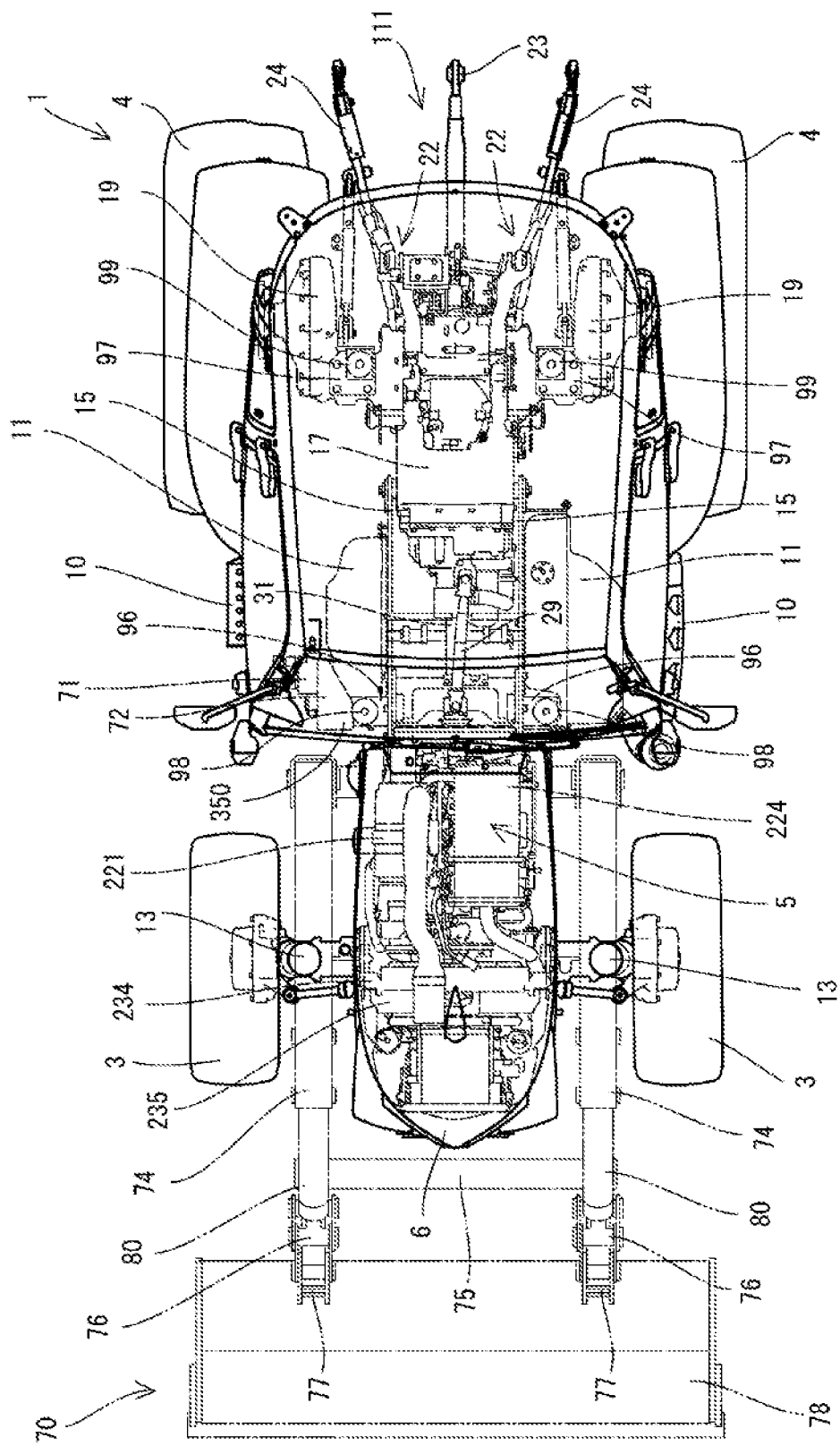
Figure 4:
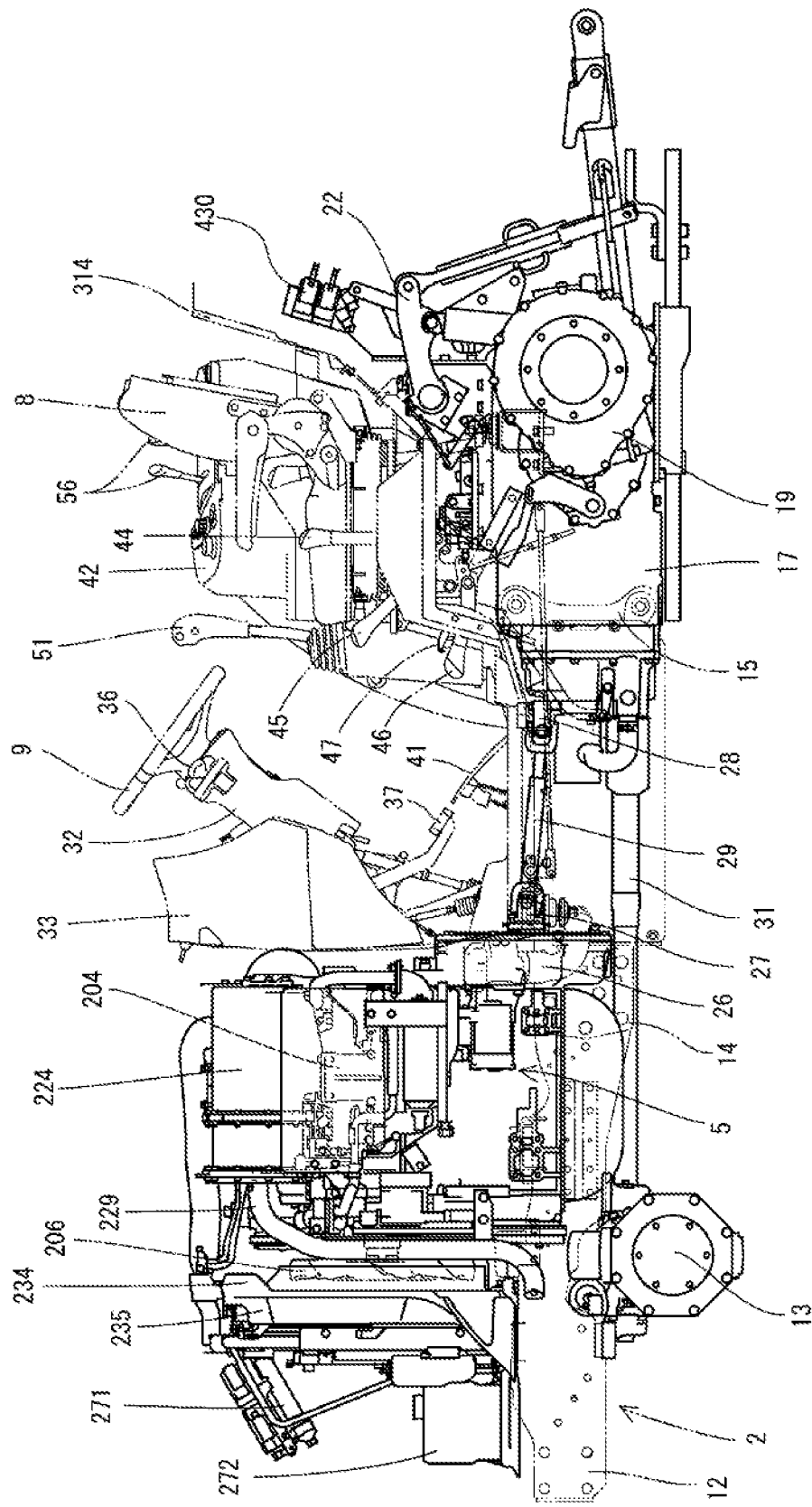
Figure 5:
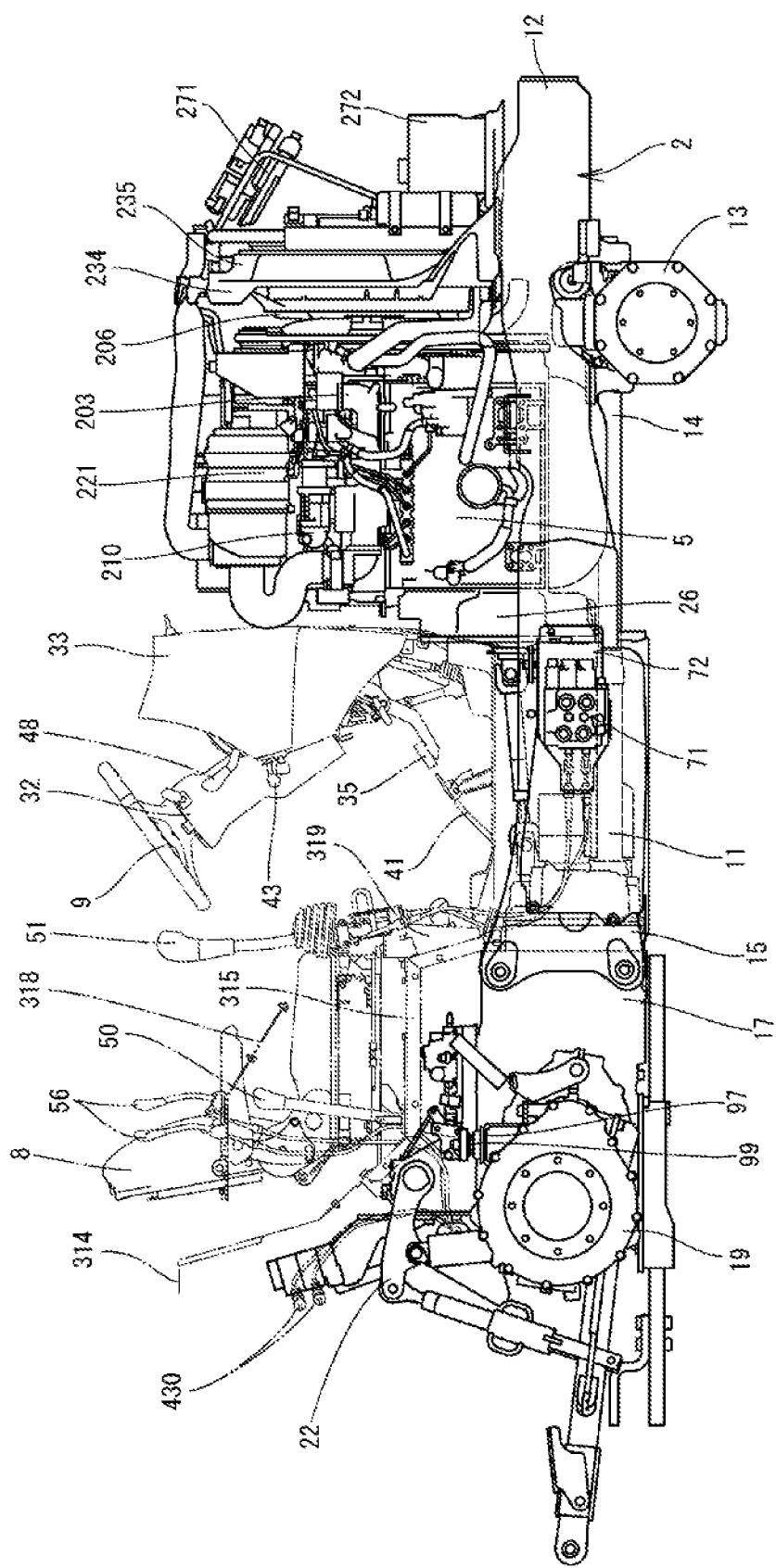

An agricultural tractor according to an embodiment of the present invention will be described hereinafter with reference to the drawings. As illustrated in FIGS. 1 through 5, a traveling body 2 of a tractor 1 is supported by a pair of left and right front wheels 3 and a pair of left and right rear wheels 4 as traveling units. The pair of left and right rear wheels 4 corresponds to a rear traveling unit. A diesel engine 5 (hereinafter simply referred to as engine) is mounted in a front portion of the traveling body 2, and when the rear wheels 4 or the front wheels 3 are driven by the engine 5, the tractor 1 is thereby caused to travel forward and in reverse. The engine 5 is covered with a hood 6. A cabin 7 is disposed on the upper surface of the traveling body 2. In the cabin 7, a cockpit seat 8 and a steering wheel 9 for steering the front wheels 3 are disposed. Steps 10 with which an operator walks up and down are externally disposed at the left and right sides of the cabin 7. Fuel tanks 11 for supplying fuel to the engine 5 are disposed below the bottom of the cabin 7.

The traveling body 2 is constituted by an engine frame 14 including a front bumper 12 and a front axle case 13 and left and right body frames 15 detachably fixed to the rear of the engine frame 14. A front axle 16 rotatably projects outward from the left and right ends of the front axle case 13. The front wheels 3 are attached to the left and right ends of the front axle case 13 through the front axle 16. The rear of the the body frame 15 is coupled to a transmission case 17 for appropriately shifting the speed of a rotative force from the engine 5 and transferring the rotative force to the four front and rear wheels 3, 3, 4, and 4. Left and right rear axle cases 19 are attached to the left and right outer side surfaces of the transmission case 17 and project outward. Left and right rear axles 20 are rotatably inserted in the left and right rear axle cases 19. The rear wheels 4 are attached to the transmission case 17 through the rear axles 20. The left and right rear wheels 4 have upper sides covered with left and right rear fenders 21.

The fuel tanks 11 are disposed at the left and right of the traveling body 2. Specifically, the left fuel tank 11 is fixed to an outer side (left side) of the left body frame 15 through front and rear brackets (not shown) and is located between the left step 10 and the left body frame 15. The right fuel tank 11 is fixed to an outer side (right side) of the right body frame 15 and is located between the right step 10 and the right body frame 15. A loader valve 71 for controlling supply of hydraulic oil to hydraulic equipment of a front loader 70 is disposed at an outer side (right side) of the right fuel tank 11. The loader valve 71 is fixed to the outer side (right side) of the right body frame 15 through a valve support bracket 72 and is located between the right step 10 and the right fuel tank 11. The valve support bracket 72 is configured to cover the front side of the right fuel tank 11 and part of the right side and the upper side of the right fuel tank 11, and is also coupled to front supporting platforms 96 described later.

The left and right front supporting platforms 96 that support the front side of the cabin 7 and left and right rear supporting platforms 97 that support a rear portion of the cabin 7 are also provided. The front supporting platforms 96 are bolted onto longitudinally intermediate portions of vehicle outer side surfaces of the left and right body frames 15, a front bottom portion of the cabin 7 is supported on the upper surfaces of the front supporting platforms 96 in a vibration proof manner through anti-vibration rubber members 98, the rear supporting platforms 97 are bolted onto left and right laterally intermediate portions of the upper surfaces of the left and right rear axle cases 19 extending horizontally in a lateral direction (left-right direction), and a rear bottom portion of the cabin 7 is supported on the upper surfaces of the rear supporting platforms 97 in a vibration proof manner through anti-vibration rubber members 99.

The diesel engine 5 is configured in such a manner that a cylinder head is mounted on a cylinder block incorporating an engine output shaft and a piston, an intake manifold 203 to be connected to an air cleaner 221 and an EGR device 210 for recirculating a part of exhaust gas from an exhaust manifold 204 are disposed on a right side surface of the diesel engine 5 (cylinder head), and a part of exhaust gas exhausted to the exhaust manifold 204 is refluxed to the intake manifold 203 so that a maximum combustion temperature in a heavy-load operation decreases, and thereby, the exhaust amount of NOx (nitrogen oxide) from the diesel engine 5 decreases. The air cleaner 221 is disposed to the upper surface (above the intake manifold 203) of the diesel engine 5.

On the other hand, the exhaust manifold 204 to be connected to a tail pipe 229 is disposed on the left side surface of the diesel engine 5 (cylinder head). The diesel engine 5 includes a continuously regenerating exhaust gas purifying device 224 (DPF) disposed to the upper surface (above the exhaust manifold 204) of the diesel engine 5. The tail pipe 229 is connected to an exhaust side of the exhaust gas purifying device 224. The exhaust gas purifying device 224 is configured to remove particulate matter (PM) in exhaust gas exhausted from the engine 5 to the outside of the vehicle through the tail pipe 229, and to reduce carbon monooxide (CO) and hydrocarbon (HC) in the exhaust gas.

As illustrated in FIGS. 4 through 8, a radiator 235 having a rear surface to which a fan shroud 234 is attached stands on the engine frame 14 to be positioned at the front surface of the engine 5. The fan shroud 234 surrounds the outer periphery of a cooling fan ahead of the engine 5, and establishes communication between the radiator 235 and the cooling fan 206. The front surface of the radiator 235 is provided with an oil cooler, a fuel cooler, and so forth, as well as an intercooler. In addition, an engine control device (engine ECU) 271 is disposed above and ahead of a heat exchanger such as the radiator 235, and a battery 272 is disposed below and ahead of the heat exchanger. The engine ECU 271 receives a sensor signal from each sensor of the engine 5, and controls driving of the engine 5.

A hydraulic lifting and lowering mechanism 22 for lifting and lowering a ground work machine (not shown) such as a rotary tiller is detachably attached to a rear portion of the transmission case 17. The ground work machine is coupled to the rear portion of the transmission case 17 through a three-point link mechanism 111 constituted by a pair of left and right lower links 23 and a top link 24. A PTO shaft 25 for transferring a PTO driving force to the ground work machine such as the rotary tiller projects rearward from the rear side surface of the transmission case 17.

The front loader 70 is detachably attached to a front portion of the traveling body 2. The front loader 70 is constituted by a pair of left and right masts 73 detachably provided to the engine frame 14, a pair of left and right lift arms 74 coupled to the masts 73 to be rotatably in a vertical direction (top-bottom direction), a coupling pipe 75 coupling the pair of left and right lift arms 74, a pair of left and right work unit links 76, a pair of left and right work unit brackets 77, a work unit 78 attached to the pair of left and right lift arms 74, a pair of left and right arm cylinders 79, a pair of left and right work unit cylinders 80, a stand 81, and a front guard 82 for protecting a front portion of the tractor 1. The front loader 70 performs work by lifting and lowering the work unit 78. In this embodiment, a bucket is used as the work unit 78, but another work unit may be attached.

A pair of left and right loader mounts 83 is fixed to the outer sides of the left and right engine frame 14, respectively. The pair of left and right masts 73 is detachably attached to the pair of left and right loader mounts 83. The lift arms 74 is constituted by welding rear lift arms 84 to be attached to the masts 73 and front lift arms 85 to be attached to the work unit 78. The rear lift arms 84 and the front lift arms 85 are fixed at predetermined angle so that the lift arms 74 are constituted in a boomerang shape in a side view of the vehicle body.

Rear ends of the rear lift arms 84 are pivotally supported on the upper ends of the masts 73, and a front portion of the front loader 70 is configured to be rotatable in the vertical direction about a pair of left and right pivot shafts 86. Distal ends (rear ends) of piston rods of the arm cylinders 79 are pivotally supported on the front ends of vertically intermediate portions of the masts 73. Proximal ends (front ends) of the arm cylinders 79 are pivotally supported on arm cylinder bracket portions of the rear lift arms 84 through pivot shafts whose longitudinal direction coincides with the vehicle width direction.

The arm cylinders 79 are attached to lower portions of the front ends of the rear lift arms 84. The pair of left and right arm cylinders 79 serves as actuators for vertical rotation of the front loader 70. Simultaneous extension and contraction of the piston rods of the pair of left and right arm cylinders 79 adjusts the vertical rotation angle of the front loader 70, that is, the angle of the pair of left and right lift arms 74 with respect to the masts 73.

The front lift arms 85 are integrally fixed by coupling longitudinally intermediate portions of the front lift arms 85 to each other by the coupling pipe 75 whose longitudinal direction coincides with the vehicle width direction. The front ends of the front lift arms 85 are attached to the work unit 78 through the work unit brackets 77. The front ends of the front lift arms 85 are pivotally supported on the work unit brackets 77. Accordingly, the work unit brackets 77 and the work unit 78 can be vertically rotatable with respect to the pair of left and right lift arms 74.

Each of the work unit links 76 is constituted by an arm-side link member 76a and a work unit-side link member 76b. The lower ends of the arm-side link members 76a are pivotally supported on longitudinally intermediate portions of the front lift arms 85. The lower ends of the work unit-side link members 76b are pivotally supported on upper portions of the work unit brackets 77.

The work unit cylinders 80 are attached to upper portions of the front ends of the lift arms 74. The upper ends of the arm-side link member 76a and the work unit-side link member 76b pivotally support distal ends of the piston rods of the work unit cylinders 80. The distal ends of the work unit cylinders 80 are pivotally supported on upper portions of the front ends of the rear lift arms 84. The pair of left and right work unit cylinders 80 serves as actuators for rotating the work unit brackets 77 in a longitudinal direction (front-rear direction). Simultaneous extension and contraction of the piston rods of the pair of left and right work unit cylinders 80 adjust the bending angles of the work unit links 76, that is, the angle formed by the arm-side link member 76a and the work unit-side link member 76b so that longitudinal rotation angle of the work unit brackets 77 with respect to the lift arms 74 can be adjusted.

Figure 6:
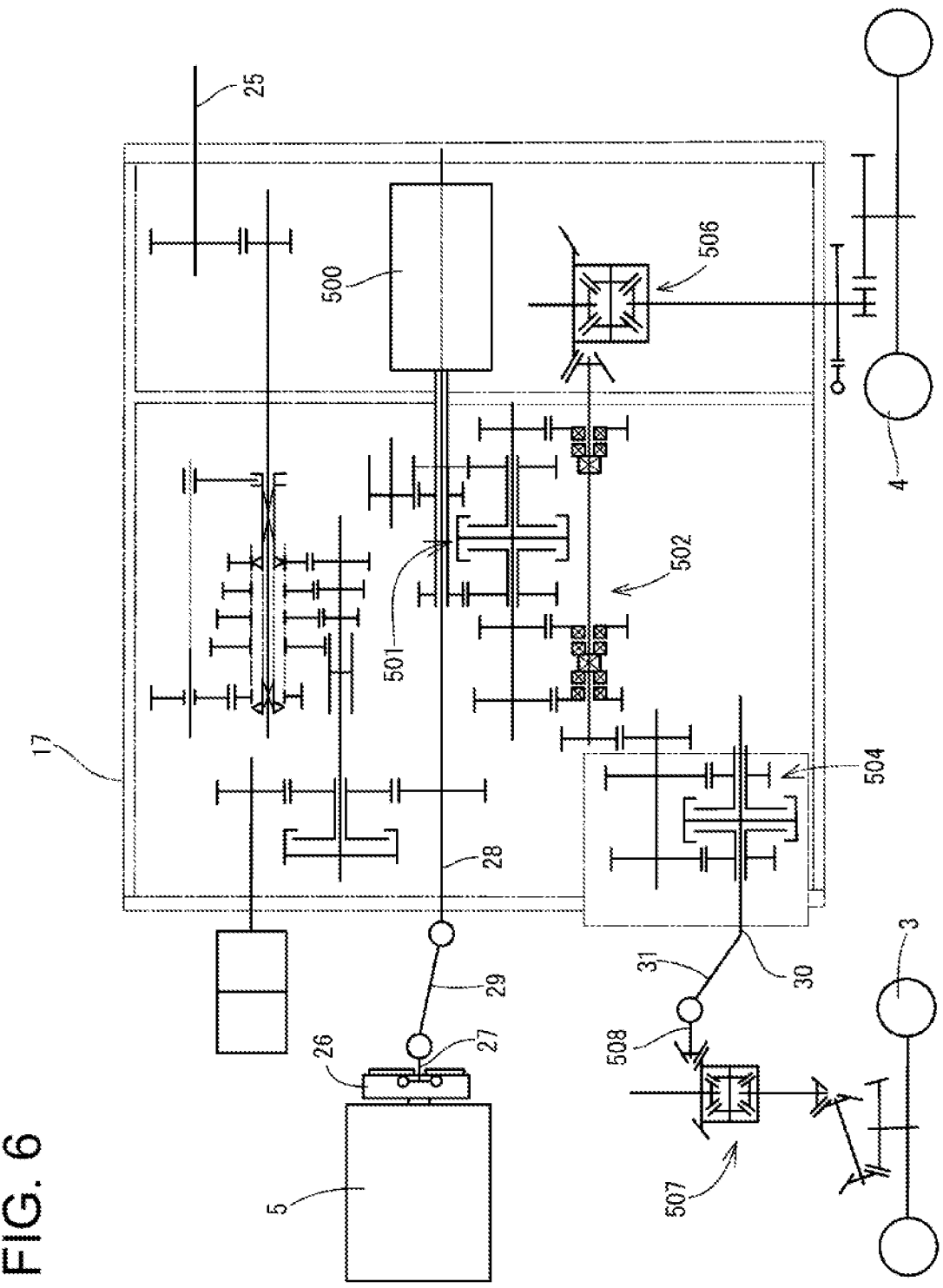
Figure 7:
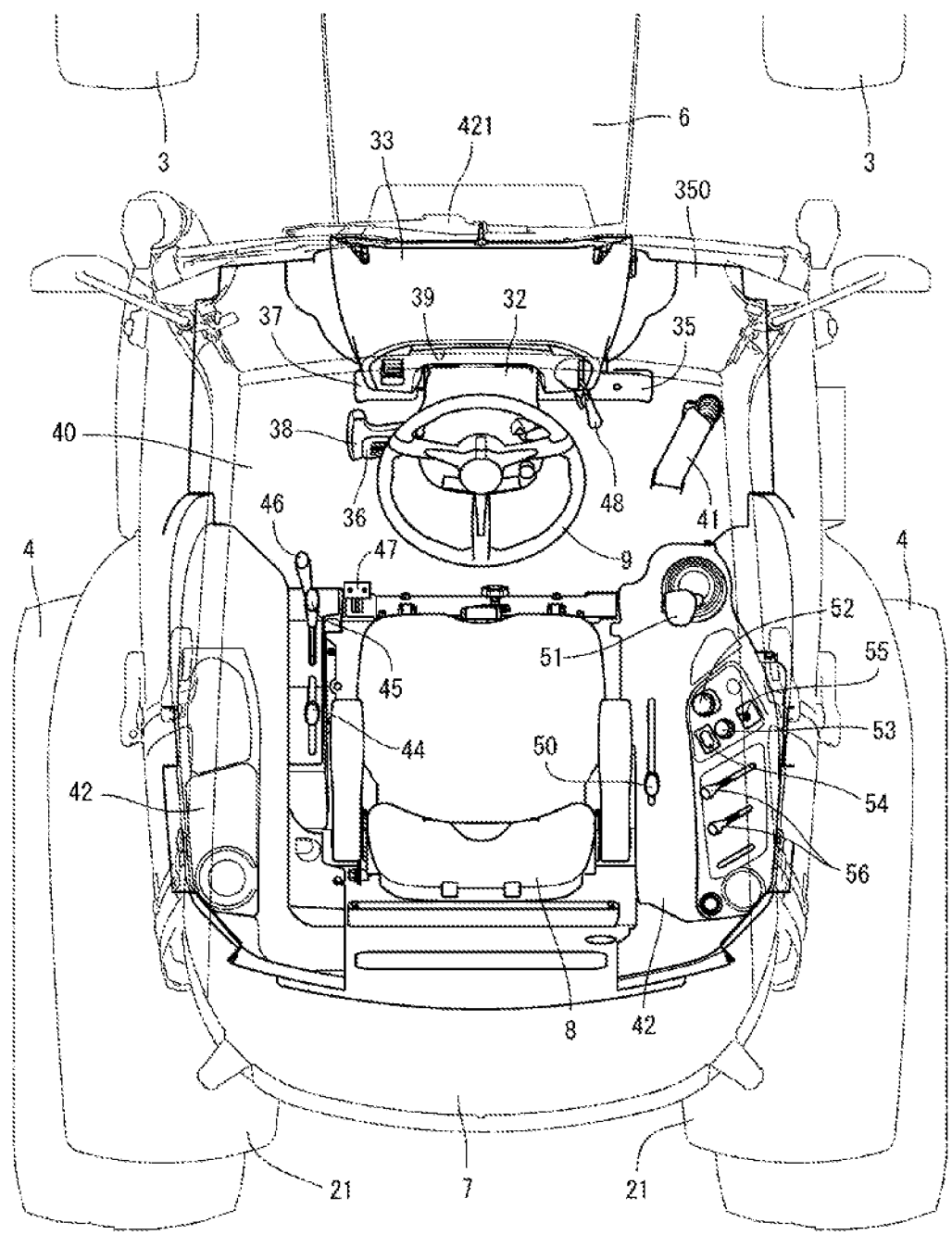
Figure 8:
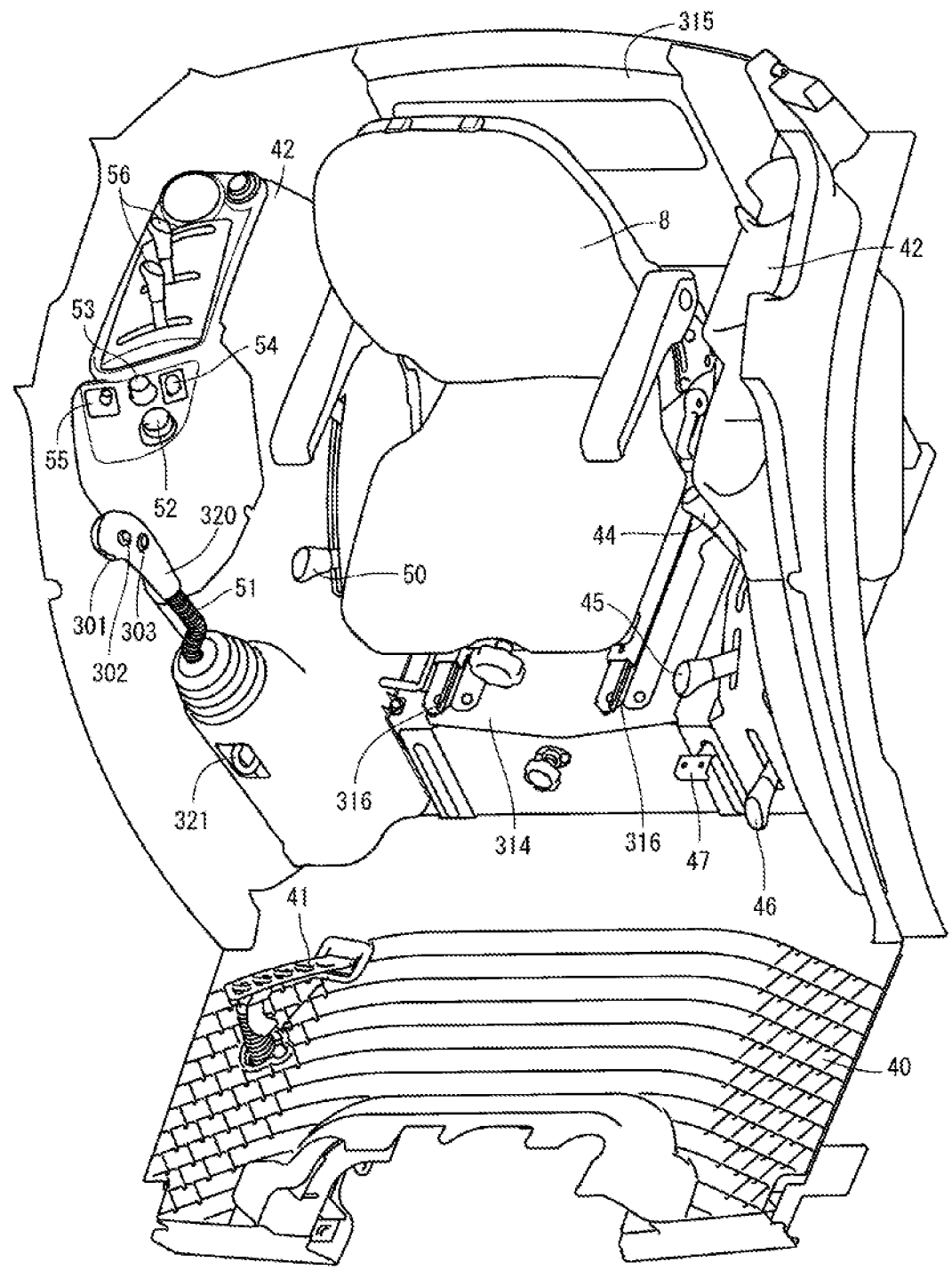
Figure 9:
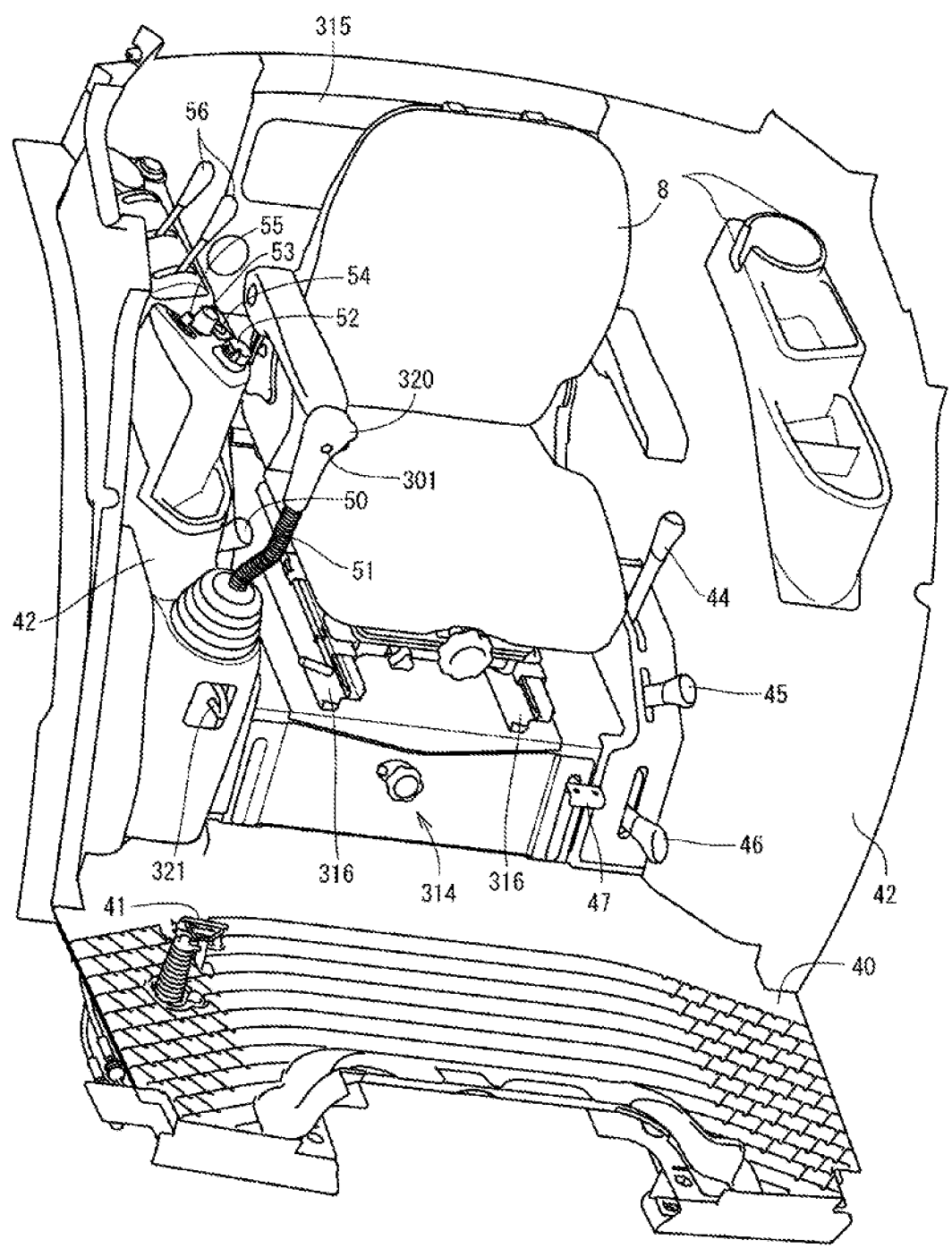
Figure 10:
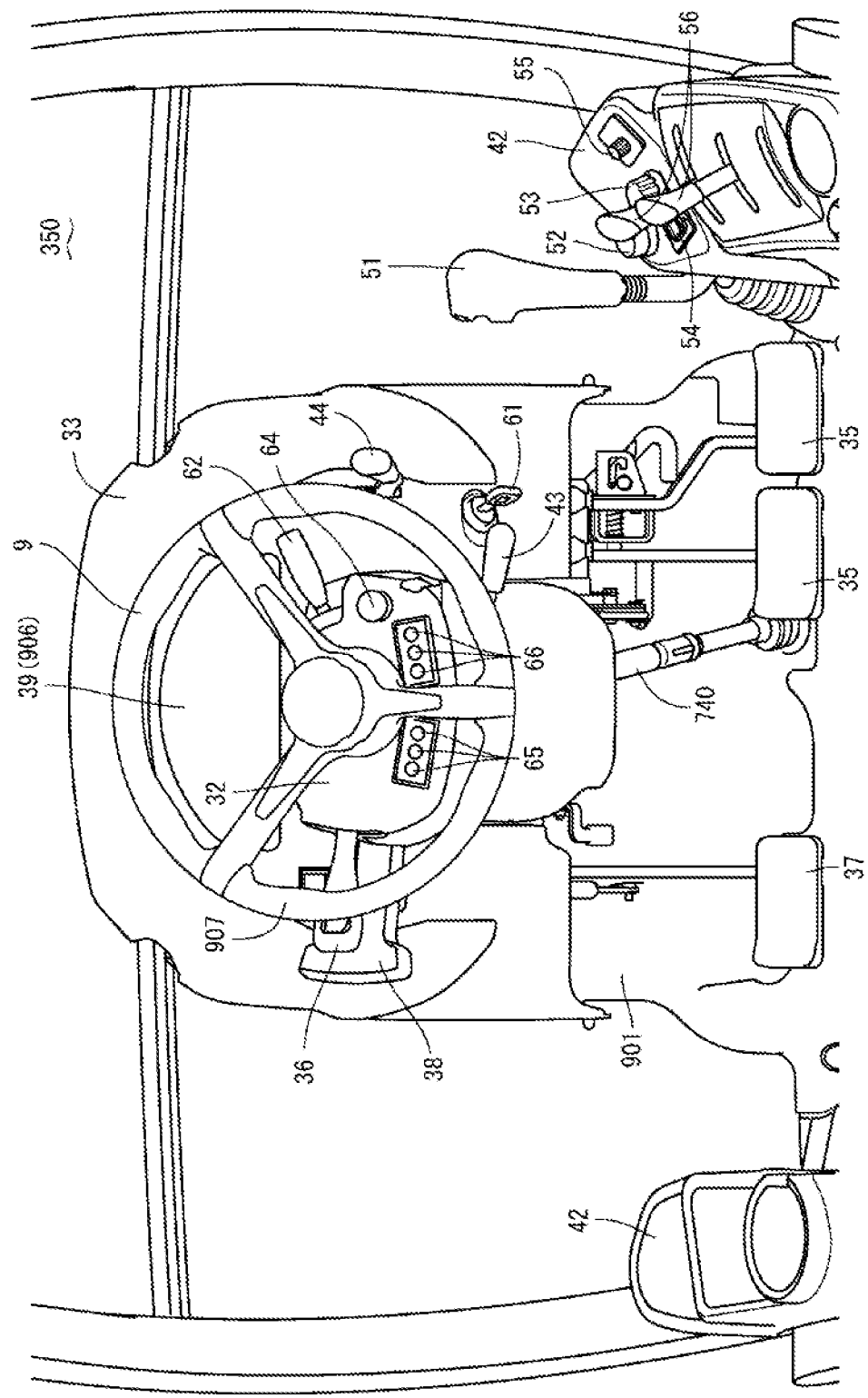
Figure 11:
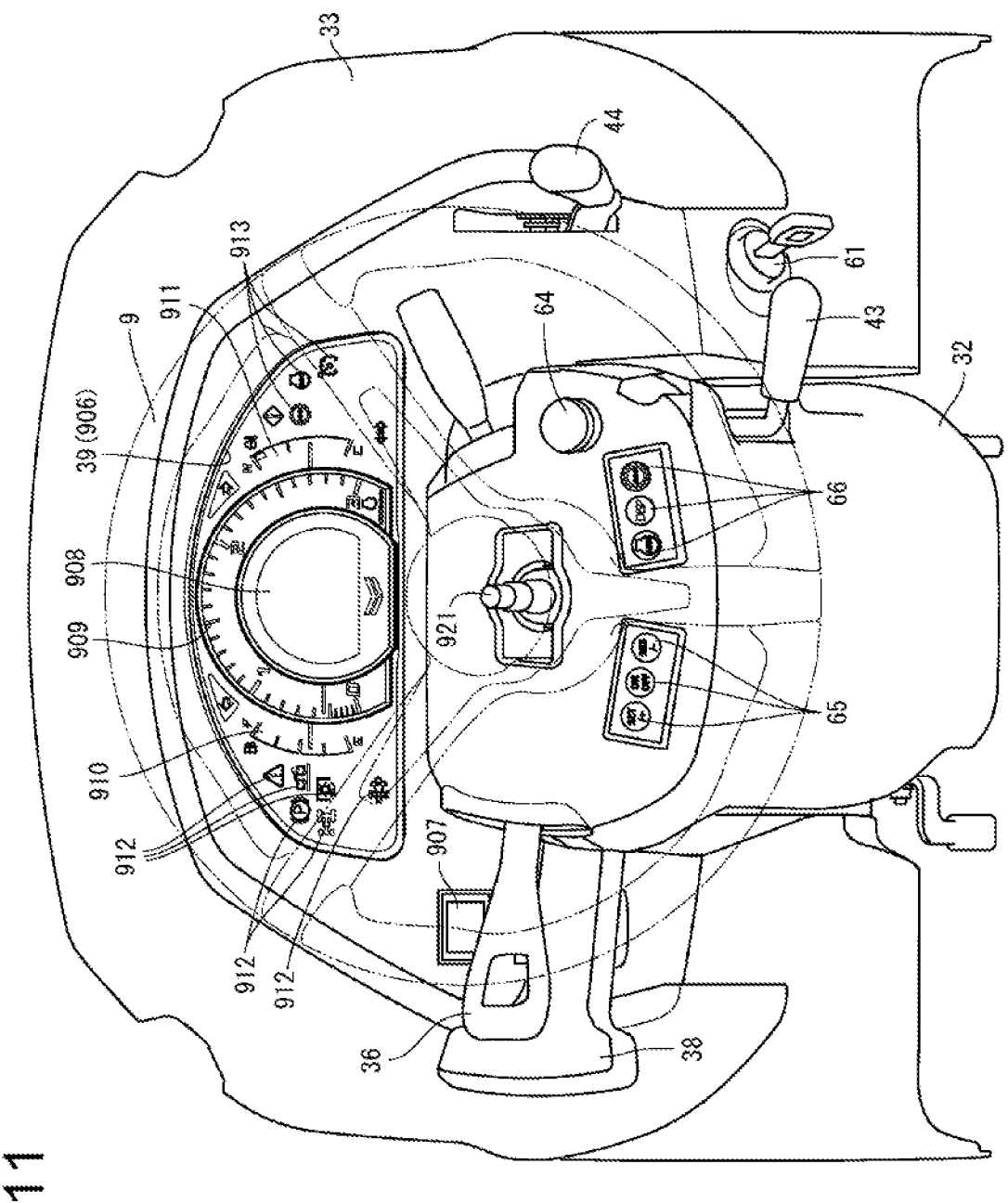

As illustrated in FIG. 6, a flywheel 26 is coupled to the output shaft (piston rod) of the engine 5 projecting rearward from the rear side surface of the engine 5. A main driving shaft 27 projecting rearward from the flywheel 26 and a main gear-shift input shaft 28 projecting forward from the front surface of the transmission case 17 are coupled to each other through a driving force transfer shaft 29 including universal joints on both ends. Inside the transmission case 17, a hydraulic stepless transmission 500, a forward/reverse switching mechanism 501, a sub-gear shift mechanism 502, a two-wheel drive/four-wheel drive switching mechanism 504, and a rear-wheel differential gear mechanism 506, for example, are disposed.

A rotative force of the engine 5 is transferred to the main gear-shift input shaft 28 of the transmission case 17 by way of the main driving shaft 27 and the driving force transfer shaft 29, and subjected to a speed shift by the hydraulic stepless transmission 500 and the sub-gear shift mechanism 502, and the shifted force is transferred to the left and right rear wheels 4 through the rear-wheel differential gear mechanism 506. At this time, the forward/reverse switching mechanism 501 switches the shifted force from the hydraulic stepless transmission 500 from forward to reverse or from reverse to forward, and the resulting force is transferred to the sub-gear shift mechanism 502.

A front wheel output shaft 30 projecting forward from a lower portion of the front surface of the transmission case 17 is coupled to a front wheel transmission shaft 508 projecting rearward from the front axle case 13 incorporating a front-wheel differential gear mechanism 507 through a front-wheel driving shaft 31. The shifted driving force, obtained by the hydraulic stepless transmission 500 and the two-wheel drive/four-wheel drive switching mechanism 504 in the transmission case 17, is transferred to the left and right front wheels 3 from the front wheel output shaft 30, the front-wheel driving shaft 31, and the front wheel transmission shaft 508 by way of the front-wheel differential gear mechanism 507 in the front axle case 13.

Next, with reference to FIGS. 7 through 12, for example, an inner configuration of the cabin 7 will be described. A steering column 32 is disposed ahead of the cockpit seat 8 in the cabin 7. The steering column 32 stands on the rear surface of a dashboard 33 disposed at the front inner surface of the cabin 7. The steering wheel 9 having a substantially circular shape in plan view is attached to the upper end of a steering shaft projecting upward from the upper surface of steering column 32.

A pair of left and right brake pedals 35 for braking the traveling body 2 is disposed below the right of the steering column 32. The forward/reverse switching lever 36 (reverser lever) for switching the traveling direction of the traveling body 2 between forward and reverse is disposed above the left of the steering column 32. A clutch pedal 37 for shutting off an output of the hydraulic stepless transmission 500 is disposed below the left of the steering column 32.

A misoperation preventing member 38 (reverser guard) extending along the forward-reverse switching lever 36 is disposed at the left of the steering column 32 below the forward-reverse switching lever 36. The misoperation preventing member 38 as a contact preventing member, which projects outward from the forward/reverse switching lever 36, can prevent an accidental contact of an operator with the forward/reverse switching lever 36 when the operator takes on or off the tractor 1. An operation display board 39 incorporating a liquid crystal panel is disposed on an upper portion of the rear surface of the dashboard 33.

A parking brake lever 43 for maintaining a braking state of the left and right rear wheels 4 and an accelerator lever 48 for setting and holding the revolution speed of the engine 5 are disposed at the right of the steering column 32. That is, the accelerator lever 48 is inserted in the dashboard 33 to be located at the right of the steering column 32, and the proximal end of the accelerator lever 48 is fixed to be rotatable in the dashboard 33. An accelerator lever sensor 48a of a potentiometer (variable resistor) that detects a vertical tilt of the accelerator lever 48 is provided in the dashboard 33. On the other hand, the brake lever 43 is disposed at a position below the accelerator lever 48, and the proximal end of the brake lever 43 is located in the steering column 32.

A main gear shift pedal 41 for controlling the revolution speed of the engine 5 or the vehicle speed, for example, is disposed at the right of the steering column 32 on a floor plate 40 ahead of the cockpit seat 8 in the cabin 7. The substantially entire upper surface of the floor plate 40 is flat. A pedal sensor 41a of a potentiometer (variable resistor) type that detects a vertical tilt of the main gear shift pedal 41 is fixed below at the bottom of the floor plate 40.

Left and right side columns 42 are disposed at the left and right of the cockpit seat 8. A sub-gear shift lever 44 for switching the output range of a traveling sub-gear shift mechanism 503 in the transmission case 17, a four-wheel drive lever 45 for switching the front and rear wheels 3 and 4 between two-wheel drive and four-wheel drive, and a PTO gear shift lever 46 for switching the drive speed of the PTO shaft 25 are disposed between the cockpit seat 8 and the left side column 42. A diff-lock pedal 47 for activating and deactivating differential driving of the left and right rear wheels 4 are disposed below the cockpit seat 8. A work unit position lever 50 for adjusting the height position of the ground work machine such as a rotary tiller is disposed between the cockpit seat 8 and the right side column 42.

A loader lever 51 for switching the loader valve 71, a PTO clutch switch 52 for engaging and disengaging a driving force transfer from the PTO shaft 25 to a work machine such as a rotary tiller, a revolution number/vehicle speed setting dial 53 for previously setting a maximum revolution speed of the engine 5 or a maximum traveling speed of the traveling body 2, a revolution number/vehicle speed selecting switch 54 for specifying a value set by the revolution number/vehicle speed setting dial 53 as the maximum revolution speed of the engine 5 or the maximum traveling speed of the traveling body 2, a vehicle speed sensitivity adjusting dial 55 for adjusting an acceleration/deceleration rate of the vehicle speed in, for example, an operation of the main gear shift pedal 41, and a plurality of hydraulic operation levers 56 (SCV levers) for switching hydraulic pressure output valves 430 disposed on the upper surface of the transmission case 17 are arranged in this order from the front on the right side column 42. Here, the hydraulic pressure output valve 430 is used for controlling supply of hydraulic oil to hydraulic equipment of a work machine such as a rotary tiller or compost casters retrofitted to the tractor 1. In this embodiment, two hydraulic operation levers 56 are disposed in conformity with the number (two) of hydraulic pressure output valves.

The dashboard 33 incorporates a wiper driving mechanism 422 behind a front windowpane 350. The wiper driving mechanism 422 is constituted by a drive motor for generating a rotative force to a wiper 421 pivotally supported on the front windowpane 321 and a gear mechanism for transferring the rotative force of the drive motor to the wiper 421. A meter panel 906 is fixed to the dashboard 33, and is integrally configured with a meter controller (meter ECU) 904 electrically connected to the meter panel 906, and the meter controller 904 is buried in the dashboard 33.

The meter panel 906 is disposed with the panel surface slightly tilted upward from the rear so as to face an operator seated on the cockpit seat 8 at a position below the front of the steering wheel 9. A plurality of switch members 907 such as a parking switch are disposed at the periphery of the meter panel 906 on the dashboard 33. A key switch 61 is a rotary switch that can be rotated with a predetermined key inserted in a keyhole, and is attached at the right of the steering wheel 9 on the dashboard 33.

A liquid crystal panel 908 for displaying characters and the like is disposed on a center display region of the meter panel 906 as a driving operation display device, and an engine speed indicator 909 that indicates the number of revolutions of the engine 5 with a needle is disposed at the periphery of the liquid crystal panel 908. On the meter panel 906, a fuel indicator 910 indicating the amount of remaining fuel with a needle and is disposed at the left of the engine speed indicator 909, and a coolant temperature gauge 911 indicating a coolant temperature of the engine 5 with a needle is disposed at the right of the engine speed indicator 909.

The meter panel 906 is also provided with a plurality of display lamps 912 and 913 such as LEDs disposed in display regions at the left and right outer sides (outside the center display region) of the engine speed indicator 909. The display lamps 912 and 913 at the left and right of the engine speed indicator 909 serve as a warning lamp and a pilot lamp. In this embodiment, one of the display lamps 912 is allocated to a regeneration lamp indicating a regeneration process state of the exhaust gas purifying device 224, and the display lamps 913 are allocated to indicator lamps indicating ON/OFF states of anti-stall control, accelerator cooperation control, and auto-cruise control.

The steering column 32 stands on and is partially buried in the rear surface of the dashboard 33. A vertically elongated steering shaft 921 is pivotally supported in the steering column 32. The upper end of the steering shaft 921 projects upward from the upper surface of the steering column 32. The steering wheel 9 having the substantially circular shape in plan view is attached to the upper end of the steering shaft 921. The lower end of the steering shaft 921 is coupled to the distal end of the vertically elongated steering shaft 740 through a universal joint. The proximal end of the steering shaft 740 is coupled to a power steering hydraulic mechanism 621 supported on a lower portion of a board support plate (air-cut plate) 901 through a universal joint.

The upper surface of the steering column 32 at the proximal portion of the steering wheel 9 is provided with a DPF regeneration switch 64 for executing regeneration control of the exhaust gas purifying device 224. That is, the DPF regeneration switch 64 is disposed in the field of view of an operator at a straight-ahead traveling work position. Thus, the DPF regeneration switch 64 is not hidden by, for example, the steering wheel 9, and a seated operator can easily visually recognize the position and a lighting display state of the DPF regeneration switch 64.

On the upper surface of the steering column 32, a plurality of switches switches 65 and 66 such as a traveling switch and a one-touch automatic switch are disposed at positions symmetric with respect to the steering shaft 921 of the steering wheel 9. Accordingly, a seated operator can visually recognize the group of switches 65 and 66 disposed on the upper surface of the steering column 32 to easily determine the positions of the traveling switch and the one-touch automatic switch. Thus, misoperations can be reduced.

The switches 65 and 66 such as the DPF regeneration switch 64, the traveling switch, and the one-touch automatic switch are disposed on the supper surface of the steering column 32 at a proximal portion of the steering wheel 9. The DPF regeneration switch 64 is disposed on the upper surface of a side portion of the steering column 32 above the brake pedals 35. On the other hand, the switches 65 and 66 such as the traveling switch and the one-touch automatic switch are disposed with spokes of the steering wheel 9 disposed on the longitudinal center line of the traveling body 2 sandwiched therebetween. In this embodiment, the left switch 65 is a traveling switch (auto-cruise operation switch) and the right switches 66 are one-touch automatic switches (accelerator cooperation control switch, display switch, and an anti-stall control switch).

Figure 12:
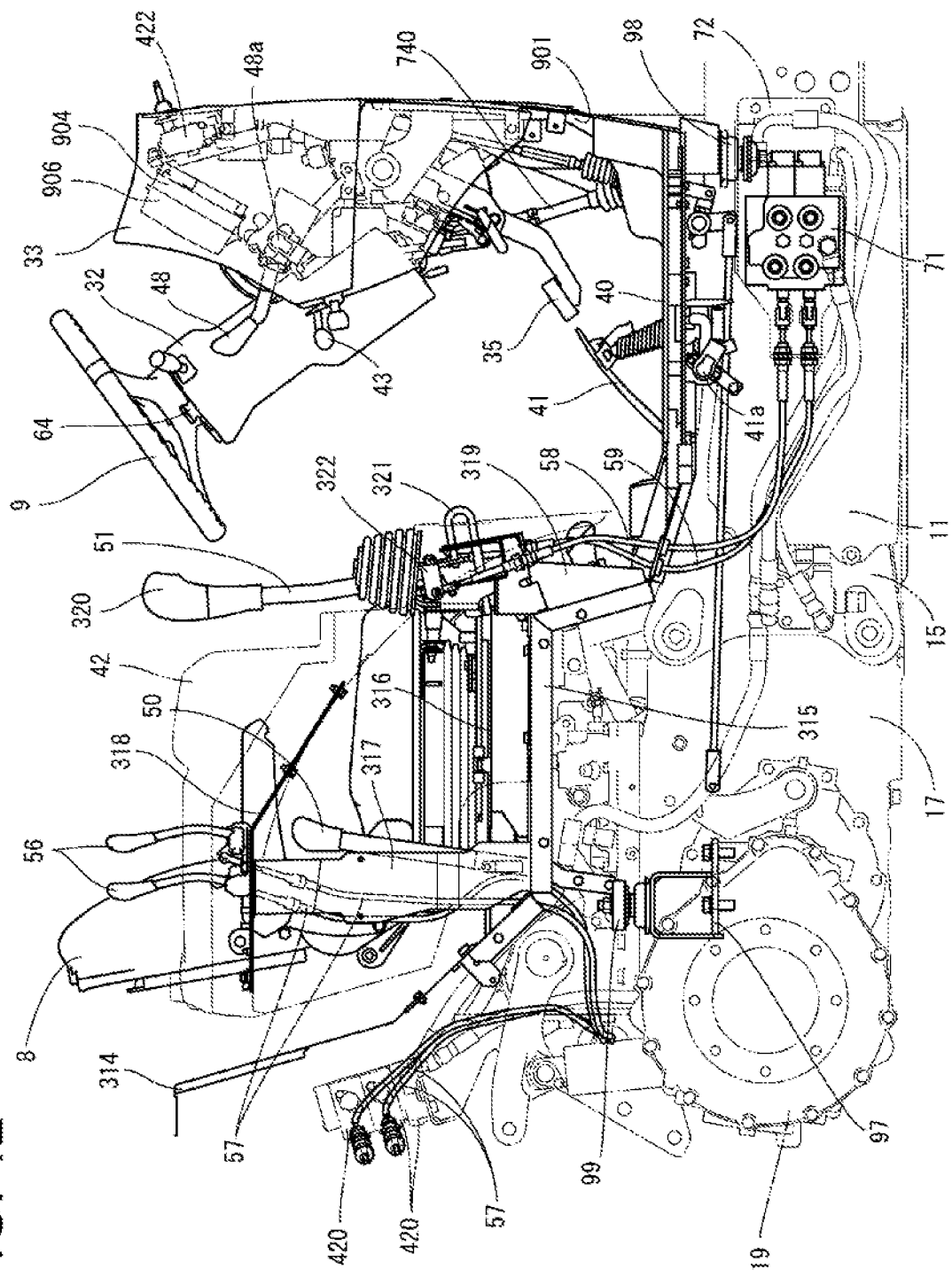
Figure 13:
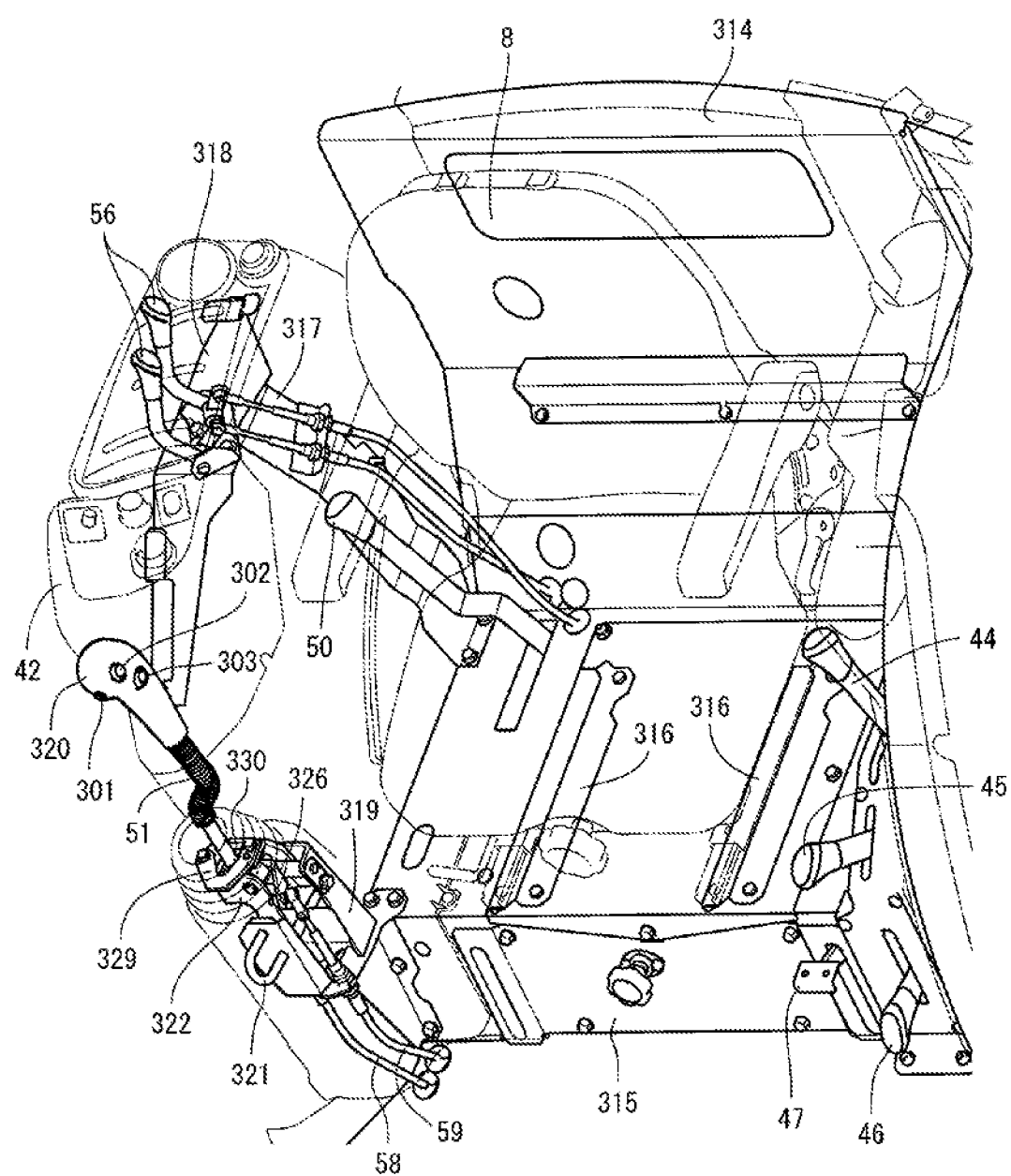

As illustrated in FIGS. 12 and 13, in the cabin 7, a seat support plate 315 having an L-plate shape in side view stands on the floor plate 40, and the cockpit seat 8 is disposed on the seat support plate 315 Rail members 316 for sliding the cockpit seat 8 in the longitudinal direction are fixed on the upper surface of the seat support plate 315, and a bottom portion of the cockpit seat 8 is locked with the rail members 316. A rear cover plate 314 is coupled to the rear edge of the seat support plate 315 so that the rear cover plate 314 thereby stands to cover a rear portion of the cockpit seat 8.

A support plate 317 stands on the right edge at the rear of the seat support plate 315, and a lever fixing bracket 318 is fixed to the upper edge of the support plate 317. The lever fixing bracket 318 is also coupled to the right side column 42 to be thereby disposed inside the right side column 42. The hydraulic operation levers 56 is placed and fixed on the upper surface of the lever fixing bracket 318, and grips (grip portions) of the hydraulic operation levers 56 project outward of the right side column 42. The hydraulic operation levers 56 are coupled to the hydraulic pressure output valve 430 through push-pull wires 57 fixed to the lever fixing bracket 318.

Figure 14:
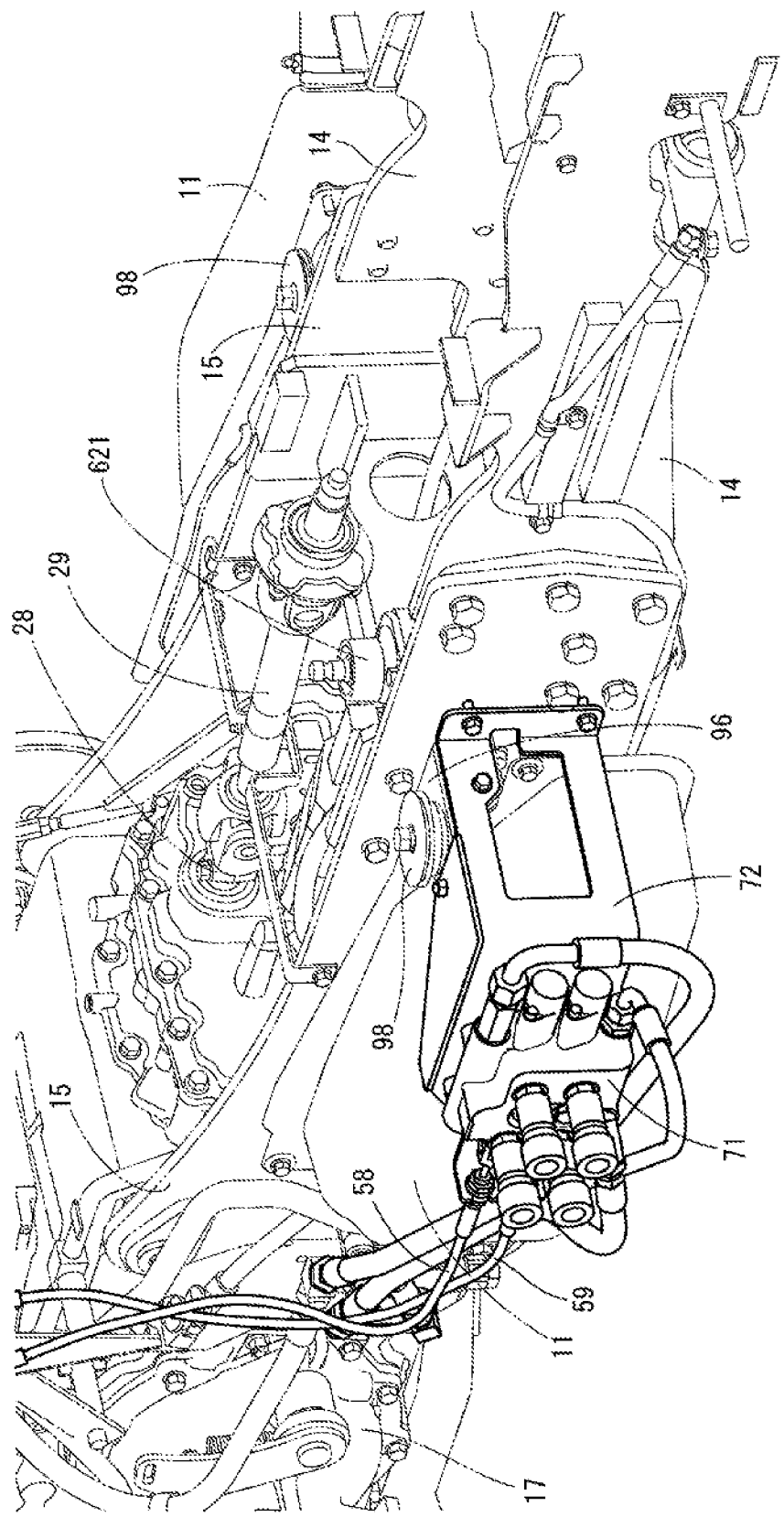
Figure 15:
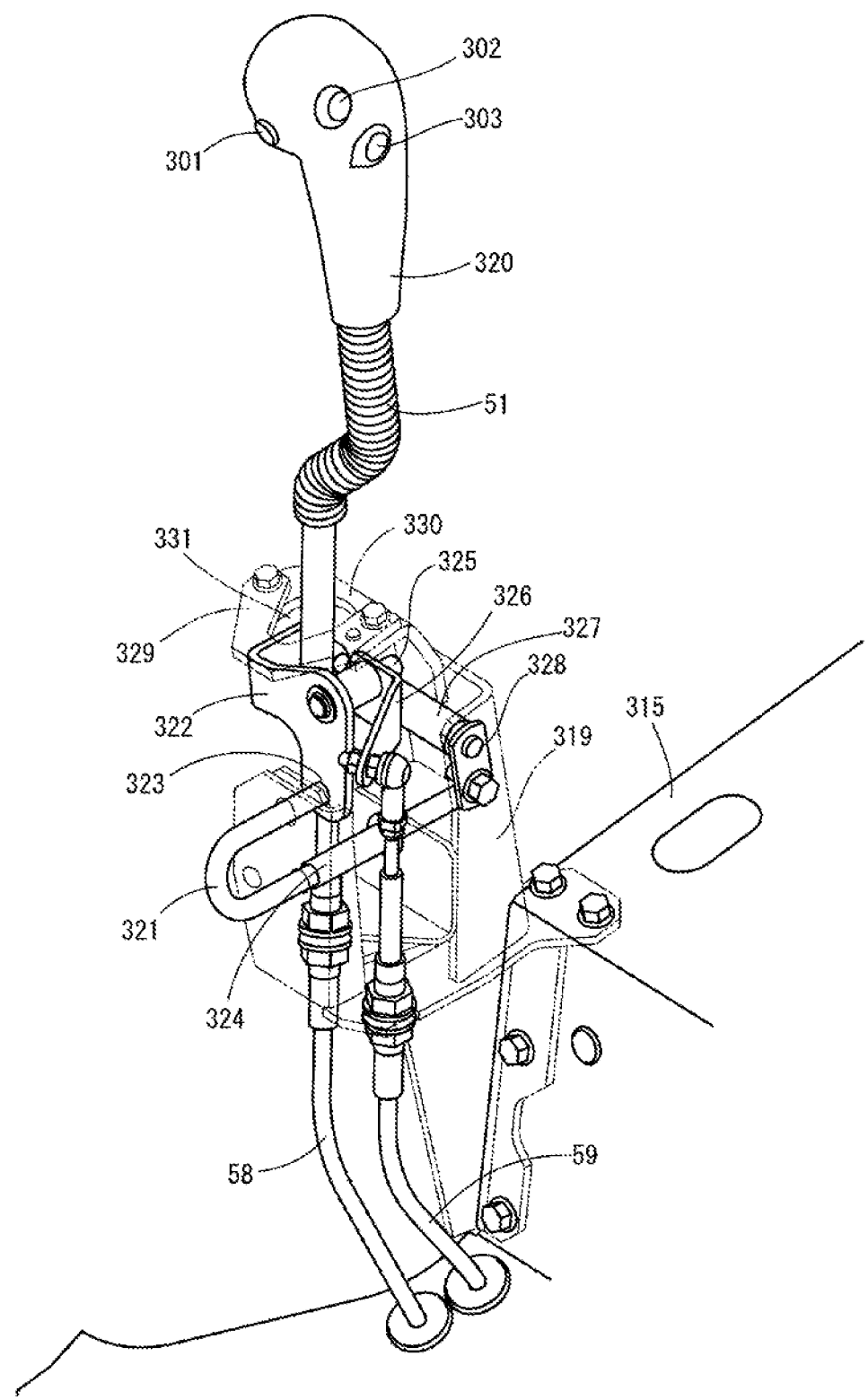
Figure 16:
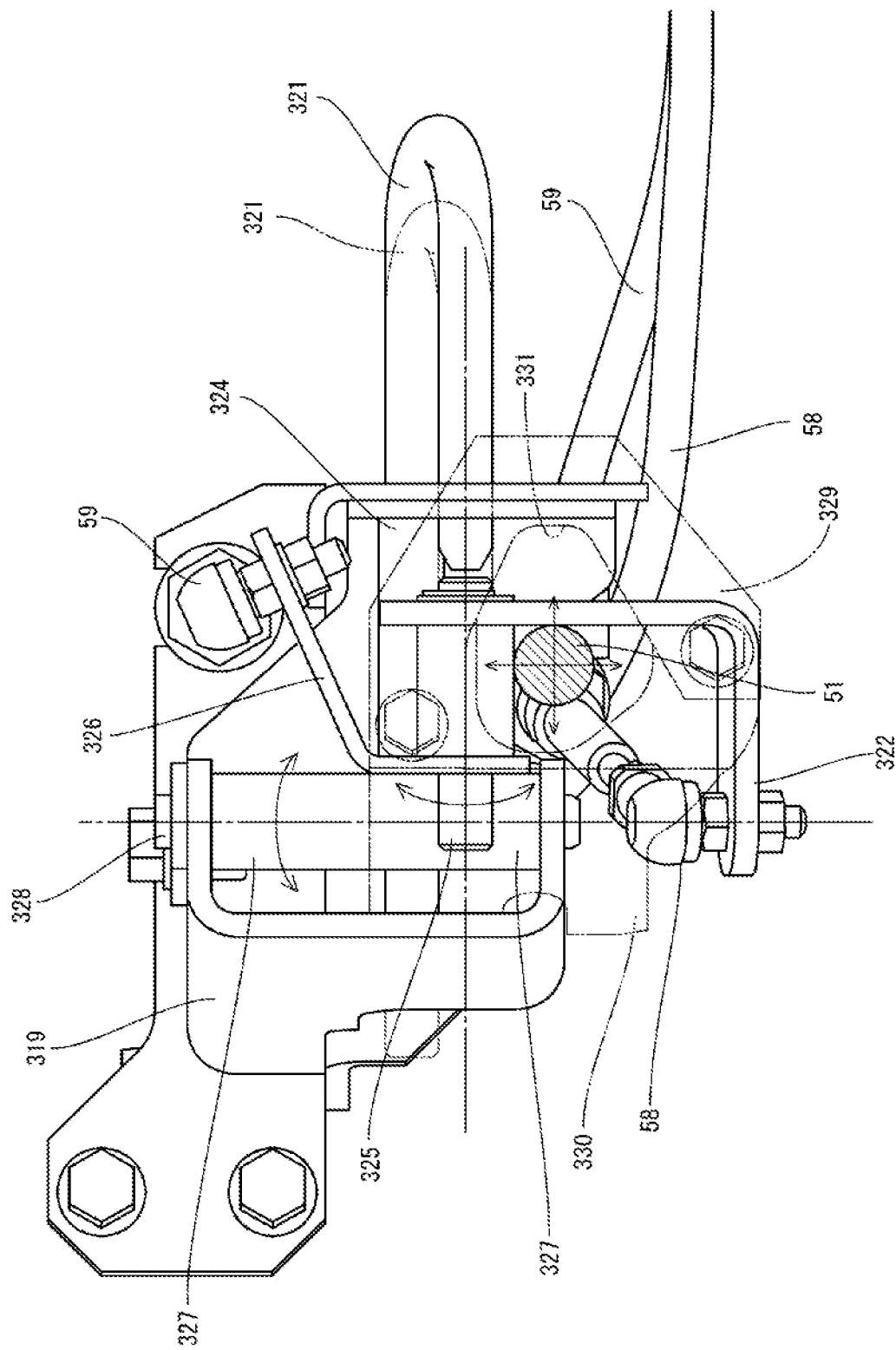
Figure 17:
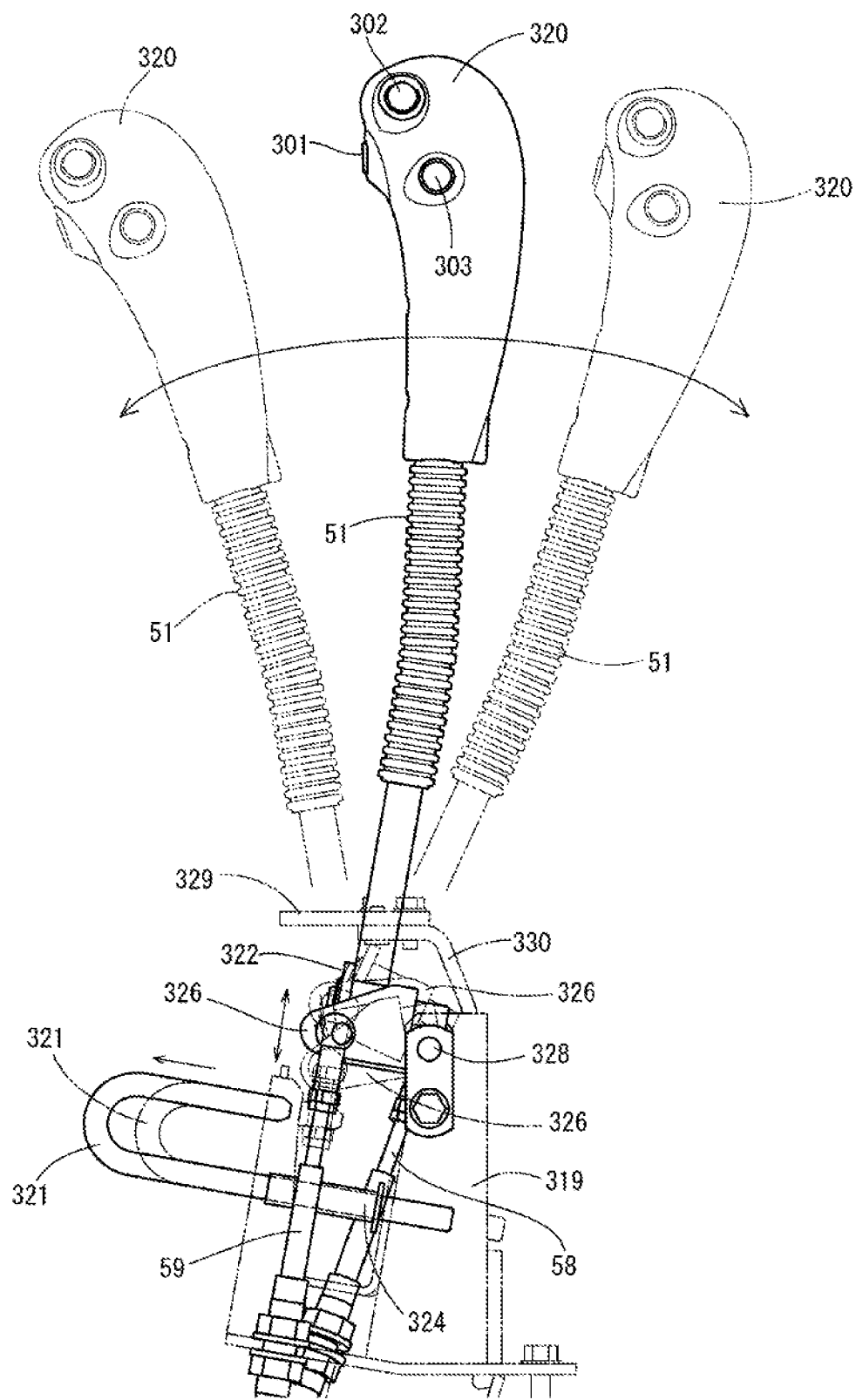
Figure 18:
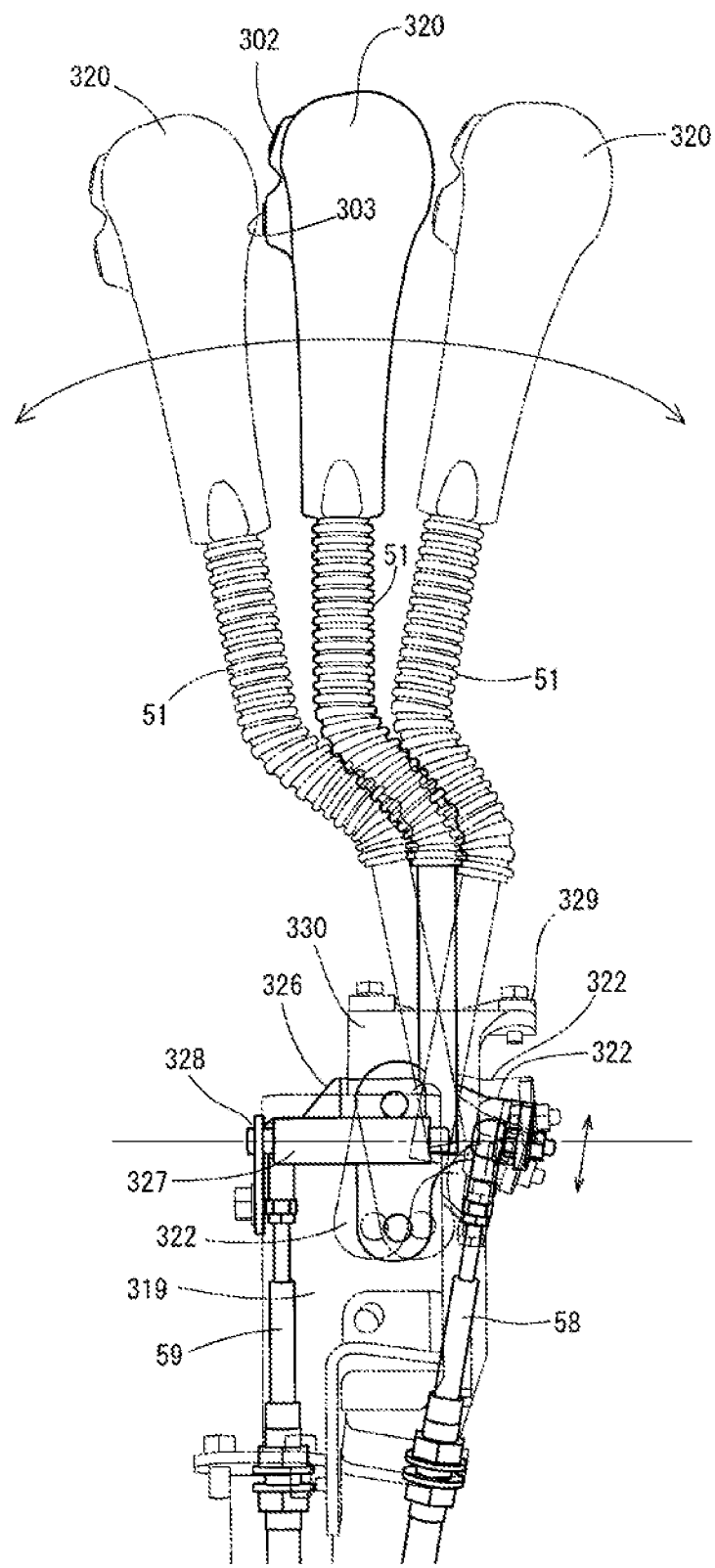

As illustrated in FIGS. 12 through 14, the lever fixing bracket 319 is fixed to the front surface of a right side portion of the seat support plate 315, and the loader lever 51 is slidably supported on the lever fixing bracket 319. The lever fixing bracket 319 is covered with the right side column 42, and a grip (grip portion) 320 of the loader lever 51 projects from the upper surface of the right side column 42. The loader lever 51 has a crank shape, and the grip 320 is disposed toward the side of the cockpit seat 8. That is, the loader lever 51 is fixed at a position ahead of the right side column 42, and the grip 320 is disposed ahead of the right of the cockpit seat 8 at which an operator can perform an operation easily. Thus, operability of the front loader 70 can be enhanced. The loader lever 51 is coupled to the loader valve 71 through the push-pull wires 58 and 59 fixed to the lever fixing bracket 319.

A lock metal fitting 321 for locking a tilt of the loader lever 51 is provided to be insertable and removable into/from the lever fixing bracket 319 The lock metal fitting 321 has a U shape, and a bent portion of the lock metal fitting 321 projects from the front surface of the right side column 42 so that the operator can easily hold the lock metal fitting 321. Thus, the operator can easily insert and remove the lock metal fitting 321 depending on the presence of an operation of the front loader 70. By inserting the lock metal fitting 321 into the lever fixing bracket 319, a tilt of the loader lever 51 can be inhibited (locked), and thus, an accidental operation to the front loader 70 can be avoided.

As illustrated in FIG. 14, for example, the loader valve 71 is fixed to the body frame 15 through the valve support bracket 72 having an L shape in plan view. The valve support bracket 72 is disposed around the front of the fuel tanks 11, and accordingly, the loader valve 71 is disposed outside the fuel tanks 11. Accordingly, while a sufficient capacity of the fuel tanks 11 is obtained, the loader valve 71 can be easily coupled to the push-pull wires 58 and 59, and easiness in assembly can be enhanced. In addition, the valve support bracket 72 is also coupled to the front supporting platforms 96 fixed to the body frame 15, and thus, the valve support bracket 72 can be supported with high stiffness.

As illustrated in FIGS. 15 through 18, the proximal end of the loader lever 51 is fixed to an intermediate portion of a lateral tilt link 322, and the distal end of the loader lever 51 is fitted in the grip 320. The lateral tilt link 322 is constituted by a V-shaped metal plate branched into two parts from a coupling portion of the lateral tilt link 322 to the proximal end of the loader lever 51, and one of the two parts is bent rearward to form an L shape in plan view.

The distal end of the push-pull wire 58 is coupled to one end of the lateral tilt link 322 at the rear, and a through hole 323 into/from which an end of the lock metal fitting 321 is inserted and removed is provided in the other end of the lateral tilt link 322 below the front surface. The other end of the lock metal fitting 321 is inserted in a guide pipe 324 fixed to the lever fixing bracket 319, and slides along the direction in which the guide pipe 324 extends. That is, when one end of the lock metal fitting 321 is inserted in the through hole 323 of the lateral tilt link 322, a tilt operation of the loader lever 51 is thereby locked, and when the end of the lock metal fitting 321 is removed from the through hole 323 of the lateral tilt link 322, the locking of the tilt operation of the loader lever 51 is canceled.

A shaft body 325 extending rearward is disposed at a bent portion of the lateral tilt link 322 above the through hole 323 (bent portion near a coupling portion of the lateral tilt link 322 to the proximal end of the loader lever 51). The shaft body 325 is inserted through the longitudinal tilt link 326 so that the lateral tilt link 322 is pivotally supported on the longitudinal tilt link 326 to be slidable laterally. That is, with a lateral tilt operation of the loader lever 51, the lateral tilt link 322 slides laterally to move the distal end of the push-pull wire 58 upward and downward.

The longitudinal tilt link 326 has one end in which the shaft body 325 is inserted and has the other end bent forward to be coupled to the distal end of the push-pull wire 59. A cylindrical boss 327 extending laterally is fixed to one end of the longitudinal tilt link 326, and the shaft body 328 fixed to the lever fixing bracket 319 is inserted in the boss 327. Accordingly, the longitudinal tilt link 326 is pivotally supported by the lever fixing bracket 319 to be slidable longitudinally. That is, with the longitudinal tilt operation of the loader lever 51, the lateral tilt link 322 slides laterally to move the distal end of the push-pull wire 59 upward and downward.

A portion of the lateral tilt link 322 coupled to the push-pull wire 58 is located on a line extending from an axis of the shaft body 325. Thus, when the loader lever 51 tilts longitudinally, the lateral tilt link 322 slides together with the longitudinal tilt link 326. At this time, the position of the distal end of the push-pull wire 58 coincides with a fulcrum of rotation of the longitudinal tilt link 326, and thus, a longitudinal tilt operation of the loader lever 51 does not act on the push-pull wire 58.

The lever fixing bracket 319 constitutes a restriction hole 331 for restricting a tilt range of the loader lever 51 by coupling both ends of each of the two U-shaped metal fittings 329 and 330 to each other above the lever fixing bracket 319. The restriction hole 331 is configured to have its lateral width and longitudinal width increase at a neutral position of the loader lever 51. The restriction hole 331 is formed to have its opening portion decrease symmetrically toward the front, and have its opening portion decrease at the right toward the rear.

The push-pull wire 59 is pushed and pulled in accordance with the longitudinal tilt operation of the loader lever 51 so that an arm valve (not shown) in the loader valve 71 acts. Accordingly, the arm cylinders 79 are driven to extend and contract to thereby rotate the left and right lift arms 74 upward and downward, resulting in a lifting and lowering operation of the work unit 78. In addition, the push-pull wire 58 is pushed and pulled in accordance with the loader lever 51, and thereby, a work unit valve (not shown) in the loader valve 71 acts. Accordingly, the work unit cylinders 80 is driven to extend and contract to thereby rotate the work unit 78 upward and perform a tilt operation of scooping oil or the like, and to rotate the work unit 78 downward to perform a dump operation of dropping the soil or the like.

The front surface of the grip 320 is provided with an engine blipping switch 301, and the left side surface of the grip 320 is provided with a valve operation switch 302 and a mode shift switch 303. That is, since the grip 320 is held with the right hand of the operator, the engine blipping switch 301 is located at a position at which the engine blipping switch 301 can be operated with, for example, a forefinger, and the valve operation switch 302 and the mode shift switch 303 are located at positions at which the valve operation switch 302 and the mode shift switch 303 can be operated with a thumb. Thus, the operator can easily operate the switches 301 through 303 while holding the loader lever 51 in a loader work by the front loader 70.

Figure 19:
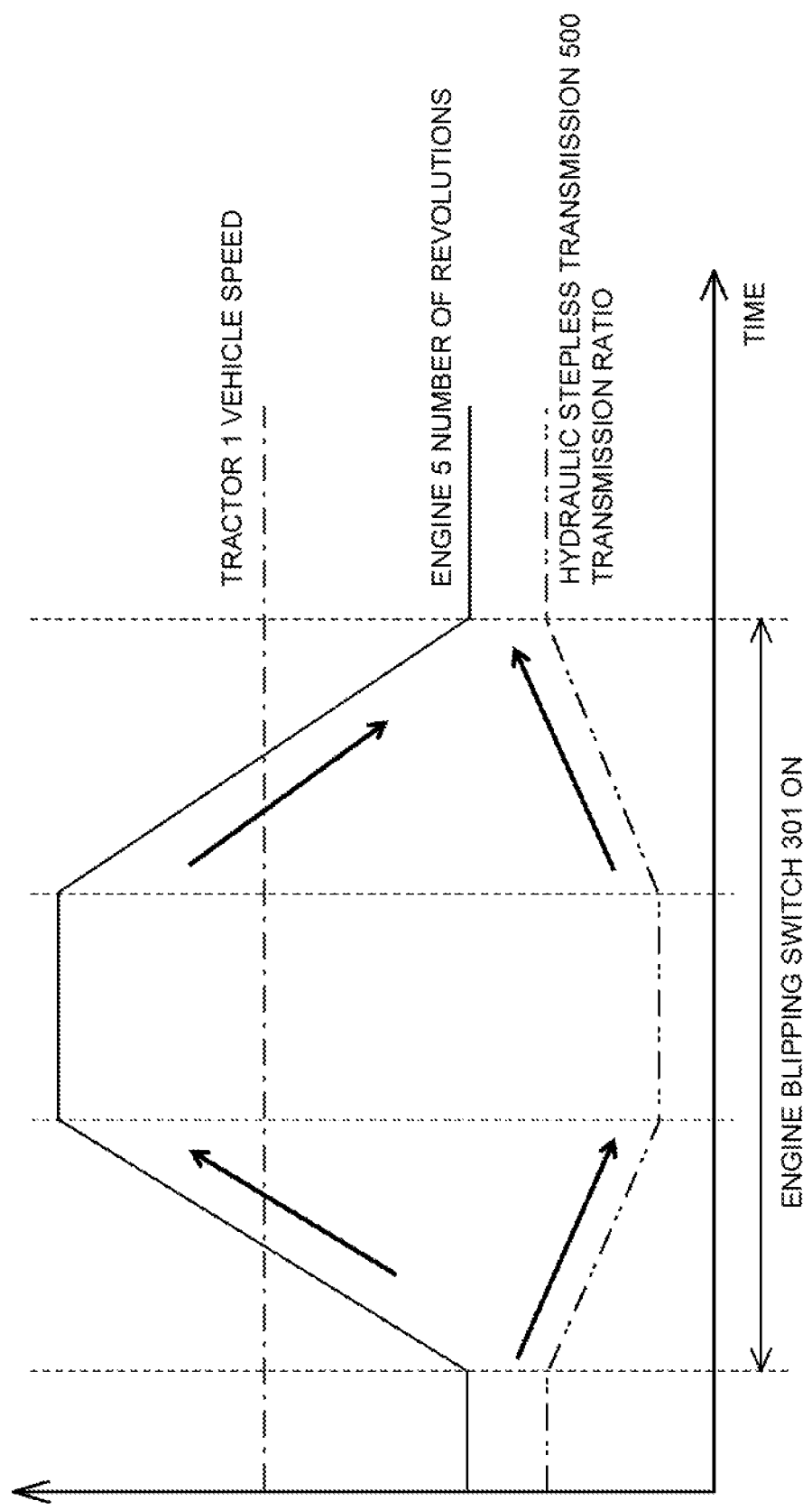

The engine blipping switch 301 is used in, for example, a case where a heavy load is applied during execution of a tilt operation of scooping soil or the like by the front loader 70 or a dozer operation of scraping the ground. As illustrated in FIG. 19, the engine blipping switch 301 is operated to increase the number of revolutions of the engine 5, and to reduce a transmission ratio by the hydraulic stepless transmission 500, thereby performing engine blipping control of keeping the vehicle speed of the tractor 1 constant. The engine blipping control is performed while the engine blipping switch 301 is pressed in a case where a first speed or a second speed is specified in sub-gear shift that can be specified up to a third speed by the sub-gear shift lever 44 and a case where mode switch control is not performed by the mode shift switch 303.

By providing the loader lever 51 with the engine blipping switch 301, the operator can determine that heavy-load work is being performed based on the sense of hearing and the sense of sight during loader work by the front loader 70, and at the same time, can easily perform engine blipping control with a hand operating the loader lever 51 (right hand in this embodiment). Thus, even under a load less than the work load, control can be promptly performed based on determination of the operator so that a hydraulic lift to the arm cylinders 79 and the work unit cylinders 80 can be increased. Thus, not only complexity in operating a work machine such as the front loader 70 can be reduced, but also a load on the work machine can be reduced.

The valve operation switch 302 is used in a case where the work unit 78 is provided with a hydraulic cylinder except for the arm cylinders 79 and the work unit cylinders 80, such as a case where a bale grab (not shown) of pinching, for example, a grass roll is used as the work unit 78 of the front loader 70. An operation of the valve operation switch 302 causes a bale grab cylinder in the bale grab serving as the work unit 78 to extend and contact, and thereby can pinch and release the grass roll.

That is, the longitudinal tilt operation of the loader lever 51 causes the arm cylinders 79 to act so that the work unit 78 is lifted and lowered vertically, the lateral tilt operation of the loader lever 51 causes the work unit cylinders 80 to act so that the bale grab serving as the work unit 78 is tilted vertically, and the operation of the valve operation switch 302 of the loader lever 51 causes the bale grab cylinder to act so that an operation of opening and closing the bale grab serving as the work unit 78 can be performed. Accordingly, in the case of using the bale grab as the work unit 78, only the use of the loader lever 51 can perform work of loading a grass roll on a carriage, and thus, operability of the operator can be enhanced.

The mode shift switch 303 is used in the case of performing switching among maximum revolution speeds and maximum speeds previously set for a plurality of modes. This embodiment is based on the case of two modes of a first mode and a second mode, but setting of three or more modes may be performed. Maximum revolution speeds and maximum vehicle speeds in the first and second modes are set by operating the revolution number/vehicle speed setting dial 53 and the revolution number/vehicle speed selecting switch 54 serving as revolution number/vehicle speed setting operation tools. As the maximum revolution speed and the maximum vehicle speed set in each of the first and second modes, the revolution speed of the engine 5 and the vehicle speed of the tractor 1 at maximum positions of the accelerator lever 48 and the main gear shift pedal 41 are set.

An operation of the mode shift switch 303 causes switching between the first mode and the second mode to be performed. In accordance with the operation of the mode shift switch 303, the maximum revolution speeds and the maximum vehicle speeds in the first and second modes are switched. In this embodiment, a maximum revolution speed R2 and a maximum vehicle speed V2 in the second mode are set smaller than a maximum revolution speed R1 and a maximum vehicle speed V1 in the first mode.

At this time, in the case of performing conveyance work by the front loader 70, for example, while the work unit 78 holds a conveyance object (e.g., soil, snow, or grass rolls), the mode shift switch 303 is operated to switch to the second mode so that the tractor 1 is moved at low speed. Thus, falling of the conveyance object, for example, can be prevented. On the other hand, in a case where no conveyance object is present for the work unit 78, the mode shift switch 303 is operated to switch to the first mode so that the tractor 1 is moved at high speed. Thus, the traveling time from a conveyance destination to a conveyance origin can be shortened, and thus, work can be performed efficiently.

By providing the loader lever 51 with the mode shift switch 303, the operator can easily switch a traveling speed of the tractor 1 with a hand operating the loader lever 51 (right hand in this embodiment) based on whether a conveyance object during conveyance work by the front loader 70 is present or not. Thus, while falling of a conveyance object is prevented during conveyance of the conveyance object by the front loader 70, the traveling time can be reduced in traveling after conveyance of the conveyance object is finished. Thus, work can be performed efficiently. In a case where engine blipping control with the engine blipping switch 301 or auto-cruise control (traveling control of traveling with a specified vehicle speed maintained) with the switch 65 is performed, the mode switch operation with the mode shift switch 303 inhibits execution of such control.

Figure 20:
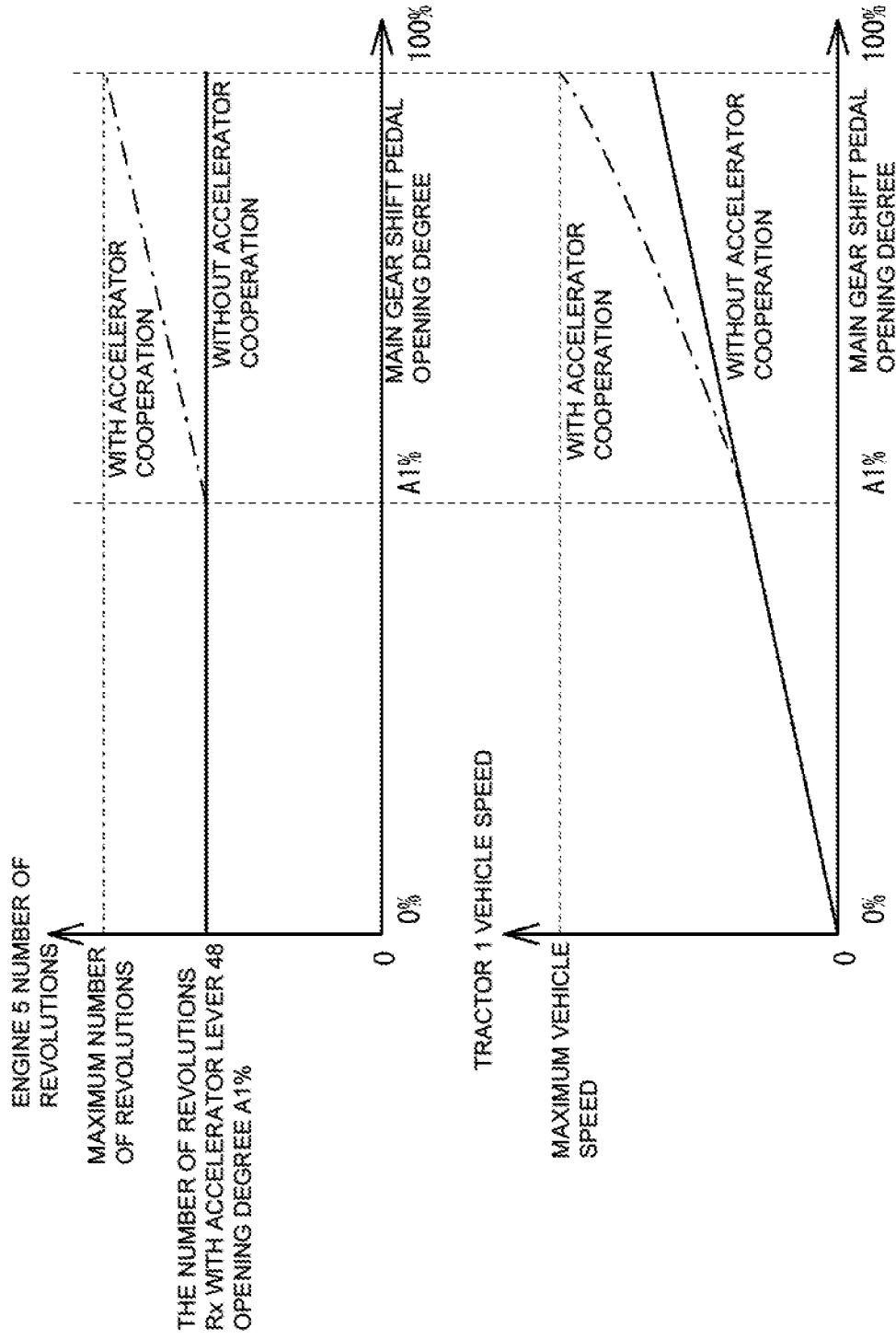

In a case where accelerator cooperation control is performed with the switch 66, a vehicle speed in a case where only the main gear shift pedal 41 is at the maximum position is set as the maximum vehicle speed set for each mode. On the other hand, in a case where no accelerator cooperation control is performed, a vehicle speed in a case where each of the main gear shift pedal 41 and the accelerator lever 48 is at the maximum position is set as the maximum vehicle speed set for each mode. As illustrated in FIG. 20, when accelerator cooperation control is performed, the vehicle speed of the tractor 1 is changed in accordance with the pressing amount of the main gear shift pedal 41, and the number of revolutions of the engine 5 is changed from the minimum number of revolutions set with the accelerator lever 48. On the other hand, in a case where no accelerator cooperation control is performed, the vehicle speed of the tractor 1 is changed with the number of revolutions of the engine 5 being kept constant at a minimum number of revolutions set with the accelerator lever 48, in accordance with the pressing amount of the main gear shift pedal 41.

The work vehicle (tractor) 1 according to this embodiment is configured to shift the speed of a driving force from the engine 5 mounted on the traveling body 2 in the transmission unit 17 and transfer the shifted force to the traveling units 3 and 4 and the work unit 70. The work vehicle (tractor) 1 includes the mode shift switch 303 for switching the maximum vehicle speed by the traveling units 3 and 4 or the maximum number of revolutions of the engine 5 set for each of a plurality of modes, and the work unit operation lever (loader lever) 51 for operating the work unit 70. The work unit operation lever 51 is provided with the mode shift switch 303. Thus, the work unit operation lever 51 can be used for switching the maximum vehicle speed by the traveling units 3 and 4 and the maximum number of revolutions of the engine 5 in accordance with an operating state of the work unit 70, and thus, the work unit 70 and the traveling units 3 and 4 can be operated at the same time with one operation tool. As a result, operability can be enhanced. In addition, the maximum vehicle speed by the traveling units 3 and 4 or the maximum number of revolutions of the engine 5 is switched in accordance with a load on the work unit 70 so that not only errors in work can be reduced but also the traveling time in a non-work state can be reduced, and fuel efficiency in the non-work state can be enhanced.

In such a work vehicle 1, in the cockpit unit (cabin) 7 on the traveling body 2, the work unit operation lever 51 is disposed ahead of and outside the cockpit seat 8, the grip 320 of the work unit operation lever 51 is disposed near the cockpit seat 8, and the grip 320 is provided with the mode shift switch 303. The mode shift switch 303 is disposed on the side surface of the grip 320 facing the cockpit seat 8.

Since the grip 320 of the work unit operation lever 51 is provided with the mode shift switch 303, the operator can easily operate the mode shift switch 303 at a position at which the operator can easily hold the grip, and thus, operability can be further enhanced. In addition, since the mode shift switch 303 is disposed on the side surface of the grip 320 facing the cockpit seat 8, the operator can easily operate the mode shift switch 303 with the thumb of a hand holding the grip 320. Accordingly, complexity in operation can be reduced.

In the work vehicle 1 described above, the work unit operation lever 51 is provided with the engine blipping switch 301 that performs engine blipping control of increasing the number of revolutions of the engine 5 while keeping the vehicle speed by the traveling units 3 and 4 constant. In addition, while the engine blipping control is being performed, an operation to the mode shift switch 303 is invalid.

Since the work unit operation lever 51 is provided with the engine blipping switch 301 for performing the engine blipping control, the operator can change the number of revolutions of the engine 5 in accordance with a load on the work unit 70 and can keep the vehicle speed by the traveling units 3 and 4 constant. Thus, a change in the vehicle speed of the traveling units 3 and 4 can be suppressed based on a load on the work unit 70. Accordingly, a decrease in working efficiency in using the work unit 70 can also be suppressed. In addition, since an operation of the mode shift switch 303 is made invalid in performing the engine blipping control, it is possible to prevent the maximum vehicle speed and the maximum engine revolution number after switching from reaching abnormal values, and thus, occurrence of a sudden accident or the like can be avoided.

The work vehicle 1 described above includes the gear shift pedal (main gear shift pedal) 41 for adjusting the vehicle speed by the traveling units 3 and 4 and the number of revolutions of the engine 5 and the forward/reverse switching lever 36 for specifying forward or reverse traveling by the traveling units 3 and 4. The transmission unit 17* includes the hydraulic stepless transmission 500 for shifting the speed of a driving force from the engine 5 and the forward/reverse switching mechanism 501 for switching the shifted driving force from the hydraulic stepless transmission 500 from forward to reverse or from reverse to forward. The transmission ratio by the hydraulic stepless transmission 500 may be changed by the gear shift pedal 41 with switching by the forward/reverse switching mechanism 501 being performed by the forward/reverse switching lever 36.

The configurations of components in the present invention are not limited to those of the illustrated embodiment, and can be variously changed without departing from the gist of the invention.

REFERENCE SIGNS LIST 2 traveling body
7 cabin
8 cockpit seat
41 main gear shift pedal
41a pedal sensor
48 accelerator lever
48a accelerator lever sensor
51 loader lever
53 revolution number/vehicle speed setting dial
54 revolution number/vehicle speed selecting switch
57 push-pull wire
58 push-pull wire
59 push-pull wire
61 key switch
62 operation lever
63 operation lever
64 regeneration switch
70 front loader
301 engine blipping switch
302 valve operation switch
303 mode shift switch
317 support plate
318 lever fixing bracket
319 lever fixing bracket
320 grip
321 lock metal fitting
322 lateral tilt link
323 through hole
324 guide pipe
325 shaft body
326 longitudinal tilt link
327 boss
328 shaft body
329 U-shaped metal fitting
330 U-shaped metal fitting
331 restriction hole

The invention claimed is:

1. A work vehicle configured to shift, in a transmission unit, a speed of a driving force from an engine mounted on a traveling body and to transfer the shifted driving force to a traveling unit and a work unit, the work vehicle comprising:
 a mode shift switch configured to switch between:
  a first maximum vehicle speed by the traveling unit of a first mode of a plurality of modes and a second maximum vehicle speed by the traveling unit of a second mode of the plurality of modes; and
  a first maximum number of revolutions of the engine of the first mode and a second maximum number of revolutions of the engine of the second mode;
 a work unit operation lever configured to be used for operating the work unit; and
 a speed control pedal configured to adjust a vehicle speed and a number of revolutions of the engine; and
 wherein:
  the work unit operation lever is provided with the mode shift switch; and
  each mode of the plurality of modes comprises a corresponding maximum vehicle speed and a corresponding maximum number of revolutions of the engine.

2. The work vehicle according to claim 1, wherein:
 in a cockpit unit on the traveling body, the work unit operation lever is disposed ahead of and outside of a cockpit seat,
 the work unit operation lever includes a grip disposed near the cockpit seat, and
 the grip is provided with the mode shift switch.

3. The work vehicle according to claim 2, wherein the mode shift switch is disposed on a side surface of the grip, the side surface facing the cockpit seat.

4. The work vehicle according to claim 1, wherein the work unit operation lever is provided with an engine blipping switch used for performing an engine blipping operation of increasing the number of revolutions of the engine while maintaining the vehicle speed of the traveling unit constant.

5. The work vehicle according to claim 4, wherein an operation to the mode shift switch is invalid while the engine blipping operation is being performed.

6. The work vehicle according to claim 1, further comprising:
 a forward/reverse switching lever configured to specify forward traveling and reverse traveling by the traveling unit; and
 wherein:
  the transmission unit includes:
   a hydraulic stepless transmission configured to shift a speed of a driving force from the engine, and
   a forward/reverse switching mechanism configured to switch the shifted driving force from the hydraulic stepless transmission from forward to reverse or from reverse to forward,
  a transmission ratio by the hydraulic stepless transmission is changed with the speed control pedal, and
  switching by the forward/reverse switching mechanism is performed with the forward/reverse switching lever.

7. The work vehicle according to claim 1, wherein:
 the transmission unit includes a hydraulic stepless transmission configured to shift a speed of a driving force from the engine; and the speed control pedal is configured to adjust a transmission ratio of the transmission unit.

8. The work vehicle according to claim 1, further comprising:
a forward/reverse switching lever configurable between a first position and a second position; and
wherein:
while the forward/reverse switching lever is configured in the first position, the traveling unit is configured to travel forward; and
while the forward/reverse switching lever is configured in the second position, the traveling unit is configured to travel backward.

9. The work vehicle according to claim 8, wherein:
the transmission includes a forward/reverse switching mechanism configured to switch the shifted driving force between a first state and a second state;
while the forward/reverse switching mechanism is configured in the first position, the shifted driving force is in the first state; and
while the forward/reverse switching mechanism is configured in the second position, the shifted driving force is in the second state.

10. The work vehicle according to claim 1, wherein:
the mode shift switch is configurable into each of a first position corresponding to the first mode and a second position corresponding to the second mode; and
the speed control pedal is configured to adjust the vehicle speed and the number of revolutions of the engine based on a position of the mode shift switch.

11. A vehicle comprising:
a transmission unit configured to:
receive a first force from an engine mounted on a traveling body; and
output a second force to a traveling unit and a work unit;
a work unit operation lever configured to operate the work unit and comprising a mode shift switch, the mode shift switch configured to switch between:
a first maximum travel speed of a first mode of a plurality of modes and a second maximum travel speed of a second mode of the plurality of modes; and
a first maximum engine rotation speed of the first mode and a second maximum engine rotation speed of the second mode; and
a speed control pedal configured to adjust a travel speed and an engine rotation speed; and
wherein each mode of the plurality of modes comprises a corresponding maximum travel speed and a corresponding maximum engine rotation speed.

12. The vehicle according to claim 11, wherein the transmission unit includes a hydraulic stepless transmission.

13. The vehicle according to claim 12, wherein the speed control pedal is configured to adjust a transmission unit ratio based on the first force and the second force.

14. The vehicle according to claim 11, further comprising:
a forward/reverse switching lever configurable into each of a first position and a second position; and
wherein:
based on the forward/reverse switching lever being configured in the first position, the traveling unit is configured to travel forward; and
based on the forward/reverse switching lever being configured in the second position, the traveling unit is configured to travel backward.

15. The vehicle according to claim 14, wherein:
the transmission includes a forward/reverse switching mechanism configured to switch the second force between a first state and a second state; and
based on the forward/reverse switching mechanism being configured in the first position, the second force is in the first state; and
based on the forward/reverse switching mechanism being configured in the second position, the second force is in the second state.

16. The vehicle according to claim 11, further comprising:
an accelerator lever configurable into each of a first position and a second position; and
an accelerator cooperation control switch configurable into each of a third position and a fourth position; and
wherein:
while the accelerator cooperation control switch is configured in the third position and the accelerator lever is configured in the first position, the engine rotation speed is equal to a first value; and
while the accelerator cooperation control switch is configured in the third position and the accelerator lever is configured in the second position, the engine rotation speed is equal to a second value, the second value different than the first value.

17. The vehicle according to claim 16, wherein:
while the accelerator cooperation control switch is configured in the fourth position and the accelerator lever is configured in the first position, the engine rotation speed is greater than or equal to the first value; and
while the accelerator cooperation control switch is configured in the fourth position and the accelerator lever is configured in the second position, the engine rotation speed is greater than or equal to the second value.

18. The vehicle according to claim 11, further comprising:
a speed dial; and
a speed selecting switch configurable into each of a first state and a second state; and
wherein:
while the speed selecting switch is configured in the first state, the speed dial is configured to adjust the first maximum travel speed or the second maximum travel speed; and
while the speed selecting switch is configured in the second state, the speed dial is configured to adjust the first maximum engine rotation speed or the second maximum engine rotation speed.

19. A vehicle comprising:
a speed control pedal configured to adjust a travel speed and an engine rotation speed; and
a mode shift switch configured to switch between:
a first maximum travel speed of a first mode of a plurality of modes and a second maximum travel speed of a second mode of the plurality of modes; and
a first maximum engine rotation speed of the first mode and a second maximum engine rotation speed of the second mode; and
wherein each mode of the plurality of modes comprises a corresponding maximum travel speed and a corresponding maximum engine rotation speed.

20. The vehicle according to claim 19, further comprising:
a transmission unit configured to:
receive a first force from an engine mounted on a traveling body; and
output a second force to a traveling unit and a work unit; and a work unit operation lever configured to operate the work unit and comprising the mode shift switch.

* * * * *